(12) United States Patent
Augst

(10) Patent No.: US 8,947,532 B2
(45) Date of Patent: Feb. 3, 2015

(54) SYSTEM FOR MONITORING THE ENVIRONMENT OF A MOTOR VEHICLE

(75) Inventor: Alexander Augst, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 746 days.

(21) Appl. No.: 12/690,658

(22) Filed: Jan. 20, 2010

(65) Prior Publication Data

US 2010/0182432 A1 Jul. 22, 2010

Related U.S. Application Data

(63) Continuation of application No. PCT/EP2008/006738, filed on Aug. 16, 2008.

(30) Foreign Application Priority Data

Sep. 18, 2007 (DE) .......................... 10 2007 044 536

(51) Int. Cl.
*H04N 7/18* (2006.01)
*B60R 1/00* (2006.01)
*B60R 1/04* (2006.01)
*B60R 1/12* (2006.01)

(52) U.S. Cl.
CPC ... *B60R 1/00* (2013.01); *B60R 1/04* (2013.01); *B60R 1/12* (2013.01); *B60R 2001/1215* (2013.01); *B60R 2001/1253* (2013.01); *B60R 2300/106* (2013.01); *B60R 2300/205* (2013.01); *B60R 2300/301* (2013.01); *B60R 2300/302* (2013.01); *B60R 2300/305* (2013.01); *B60R 2300/306* (2013.01); *B60R 2300/50* (2013.01); *B60R 2300/70* (2013.01); *B60R 2300/8066* (2013.01)
USPC .......................................... 348/148; 348/149

(58) Field of Classification Search
None
See application file for complete search history.

(56) References Cited

U.S. PATENT DOCUMENTS 6,447,128 B1 * 9/2002 Lang et al. ..................... 359/871
7,526,103 B2 4/2009 Schofield et al.
(Continued)

FOREIGN PATENT DOCUMENTS

| DE | 198 45 567 A1 | 4/2000 |
|---|---|---|
| DE | 199 61 313 A1 | 7/2001 |
| DE | 100 36 875 A1 | 2/2002 |
| DE | 201 18 868 U1 | 4/2002 |

(Continued)

OTHER PUBLICATIONS

German Search Report dated Jul. 31, 2008 including partial English translation (Nine (9) pages).

(Continued)

*Primary Examiner* — Mehrdad Dastouri
*Assistant Examiner* — James Anderson, II
(74) *Attorney, Agent, or Firm* — Crowell & Moring LLP

(57) ABSTRACT

A system for monitoring the environment of a motor vehicle, includes imaging devices for taking a sequence of images, which sequence contains images of at least a part of the environment of the motor vehicle. A display unit reproduces at least one image detail of the image sequence in the vehicle interior. A device automatically changes the detail of the environment shown by the reproduction of the image detail by the display unit. One or more devices for determining at least one earlier position of the motor vehicle is provided, wherein the environmental detail can be automatically adapted as a function of the earlier position of the motor vehicle.

22 Claims, 12 Drawing Sheets

(56) References Cited

U.S. PATENT DOCUMENTS

| | | | |
|---|---|---|---|
| 7,717,841 B2 * | 5/2010 | Brendley et al. | 600/27 |
| 2002/0003571 A1 * | 1/2002 | Schofield et al. | 348/148 |
| 2002/0075387 A1 | 6/2002 | Janssen | |
| 2004/0201671 A1 | 10/2004 | Weis et al. | |
| 2004/0212676 A1 | 10/2004 | Mathes et al. | |
| 2004/0260439 A1 * | 12/2004 | Endo et al. | 701/36 |
| 2005/0012685 A1 | 1/2005 | Okada et al. | |
| 2005/0195383 A1 * | 9/2005 | Breed et al. | 356/4.01 |
| 2006/0202984 A1 * | 9/2006 | Yang et al. | 345/419 |
| 2006/0210114 A1 | 9/2006 | Oka et al. | |
| 2006/0227214 A1 * | 10/2006 | Fleury et al. | 348/148 |
| 2007/0070197 A1 * | 3/2007 | Akatsuka et al. | 348/118 |
| 2008/0049105 A1 * | 2/2008 | Shimizu et al. | 348/148 |

FOREIGN PATENT DOCUMENTS

| | | |
|---|---|---|
| DE | 102 46 652 A1 | 4/2004 |
| DE | 103 21 228 A1 | 11/2004 |
| DE | 103 36 329 A1 | 3/2005 |
| DE | 10 2006 008 703 A1 | 9/2006 |
| DE | 20 2006 015 992 U1 | 1/2007 |
| DE | 10 2005 046 671 A1 | 4/2007 |
| EP | 1 211 132 A2 | 6/2002 |
| JP | 2006504166 A * | 2/2006 |

OTHER PUBLICATIONS

International Search Report dated Jul. 16, 2009 including English translation (Four (4) pages).

* cited by examiner

SYSTEM FOR MONITORING THE ENVIRONMENT OF A MOTOR VEHICLE

CROSS-REFERENCE TO RELATED APPLICATIONS

This application is a continuation of PCT International Application No. PCT/EP2008/006738, filed Aug. 16, 2008, which claims priority under 35 U.S.C. §119 from German Patent Application No. DE 10 2007 044 536.0, filed Sep. 18, 2007, the entire disclosures of which are herein expressly incorporated by reference.

BACKGROUND AND SUMMARY OF THE INVENTION

The invention relates to a system for monitoring the environment (surroundings) of a motor vehicle having imaging devices for taking a sequence of images, which sequence contains images of at least a part of the environment of the motor vehicle, a display unit for reproducing at least one image detail of the image sequence in the vehicle interior, and having devices for the automatic change of the detail of the environment shown by the reproduction of the image detail by way of the display unit.

Systems of this type are known from DE 100 36 875 A1, EP 1 211 132 A2 and DE 20 2006 015 992 U1. A monitoring of the rearward vehicle environment can be improved by the systems described in these documents such that a camera for monitoring the rear space is arranged directly on the rearward structure of the vehicle, whereby it has a more suitable viewing position of the closer rearward vehicle environment than a rearview mirror which, as a result of its operating principle, is to be arranged forward of the driver's seat. However, the indicated documents do not disclose a satisfactory solution with respect to an intelligent and/or situation-appropriate definition of the environmental detail shown by the display unit provided in the above-indicated fashion.

It is an object of the invention to provide a system with an improved definition of the environmental detail shown by the display unit.

This object is achieved by a system according to the invention including imaging devices for taking a sequence of images or pictures (for example, MPEG video stream or sequence of frames) which contains images at least of a part of the environment of the motor vehicle, and a display unit for the playback of at least one image detail of the image sequence in the vehicle interior. For example, the imaging devices can supply an image sequence with 1,920×1,080 pixels, and the display unit plays back a rectangular cutout of 240×180 pixels from this image sequence. The detail of the environment shown by the display unit, such as a TFT display, is therefore defined, on the one hand by the definition of the image detail of the image sequence and, on the other hand, by the definition of the part of the environment which is imaged in the image sequence. In this case, the image sequence itself may already be restricted to a relatively narrow part of the environment, for example, the rearward space of the vehicle. However, in the opposite extreme case, the image sequence may be constructed as a panoramic view of the vehicle environment. In particular, one or more cameras may be used as imaging devices, but so can other imaging devices. In the case of several cameras, which together simultaneously or alternately are used as imaging devices, the individual cameras do not necessarily have to photograph overlapping or mutually adjacent parts of the environment.

The system according to the invention also includes devices for the automatic change of the environmental detail shown by the playback of the image detail by means of the display unit. In order to adapt the environmental detail, according to the above, particularly the photographed part can be adapted to the environment in that, for example, a camera serving as the imaging device is swiveled or a switch-over to another camera takes place, and/or the played-back image detail is adapted. In the above example of a rectangular image detail, particularly its position in the image sequence originally supplied by the imaging devices can be changed. Definition or adaptation of the environmental detail naturally does not relate to an active intervention in the environment but to one of the above-mentioned measures concerning image taking and/or playback.

The fact that the change of the environmental detail takes place automatically relieves the driver. However, this will be a considerable advantage only if the finally displayed detail of the environment also shows to the driver those image contents which most probably are of interest and/or of use to him. The invention is based on the recognition that especially those road areas should be considered to be of special interest and/or use which had just been traveled by the motor vehicle itself. Since the trajectories of motor vehicles moving in road traffic are typically greatly affected by the placing of roads and lanes, it is highly probable that particularly a motor vehicle that is following is seen precisely where the own vehicle had just been. When a conventional rear view mirror is used, which is aligned such that it offers a view of the rearward vehicle environment essentially along the longitudinal axis of the vehicle, this area will typically not be contained in the mirrored image, especially after considerable turns of the motor vehicle. Also known camera-based rear-view systems offer no solution for the targeted monitoring of this area in such situations.

According to the invention, the system for solving this problem has devices for determining at least one earlier position of the motor vehicle, and the detail of the environment or surroundings shown by the display unit can automatically be adapted as a function of the earlier position of the motor vehicle. The environmental or surrounding detail can therefore be adapted such that particularly—or even, as required, exclusively—those road areas are contained in the environmental detail which had just been traveled by the motor vehicle. As indicated above, for adapting the environmental detail, particularly the imaged part can be adapted to the environment in that, for example, a camera serving as the imaging device is swiveled or a switch-over to another camera takes place, and/or the played-back image detail can be adapted.

The earlier position to be defined and to be taken into account for the adaptation may, for example, be defined as a position at a certain point in time prior to the current point in time by a predetermined time period, or as a position behind the current vehicle position by a traveling path predetermined with respect to its length. The at least one earlier position may be defined in a relative manner, for example, relative to the current position of the motor vehicle, and/or in an absolute manner, for example, in GPS coordinates.

Depending on the embodiment of the invention, the term "earlier position of the motor vehicle" used here may be understood to have different meanings. It may be understood to be the center of gravity situated above the road level and/or the geometrical center of the motor vehicle at the respective earlier point in time. However, the term may also be understood as a projection of the center of gravity and/or center onto the plane of the road. Likewise, the term "earlier position"

of the motor vehicle" used here, however, as a deviation from the actual meaning of the word "position" can also be understood to be an expanded volume or an expanded surface. In the sense of a volume, the term can be understood to be the volume filled by the vehicle at the respective earlier point in time, as required, approximated by a simplifying geometrical model, such as a rectangular parallelepiped. In the sense of a surface, the term may be understood to be the surface on the road taken up by the vehicle at the respective earlier point in time, as required, approximated by a simplifying geometrical model, such as a rectangle. Also, depending on the embodiment, such a surface may again be defined as "lying" on the road or as "floating" at a defined height above the road, for example, at the height of the point of gravity and/or center.

When it is mentioned in connection with the invention that an earlier position is contained in a detail of the environment and the earlier position is defined as a point or surface within the road plane, this means that the detail of the environment is defined such that the corresponding part of the road surface is contained in the detail of the environment unless it is covered by another object. When it is mentioned in connection with the invention that an earlier position is contained in a detail of the environment and the earlier position is defined as a point, surface or volume above the road surface, this means that the detail of the environment is defined such that a hypothetical object that would be arranged at this point, in this surface or in this volume would be contained in the detail of the environment unless it would be covered by another object.

An embodiment that can be implemented particularly easily provides the defining of the earlier position only with respect to its direction relative to current vehicle alignment. It is only by the corresponding selection of the environmental detail such that the latter is defined only by the alignment of the effective viewing angle in this direction that a considerable improvement can be achieved with respect to known systems.

Because of the low vertical dimension of the traffic-relevant parts of the vehicle environment (after all, the vehicle and all other traffic participants move along on the road surface), the earlier position can be defined particularly effectively only with respect to its horizontal direction relative to the current vehicle alignment.

In addition to the direction of an earlier position relative to the current vehicle alignment, preferably at least also the distance of the earlier position relative to the current vehicle position is defined and taken into account. This distance can correspondingly also be utilized for defining an effective zoom factor of the image detail when defining the environmental detail.

For reasons of simplicity and without limiting the generality, it will be assumed in the following that, because of the above-mentioned low vertical dimension of the traffic-relevant parts of the vehicle environment, no vertical defining of the image detail is required which exceeds that vertical change of the image detail that accompanies a zoom-in or zoom-out for changing the horizontal picture detail. However, naturally the idea of the invention can be implemented accordingly also when taking into account the necessity of a vertical definition of the image detail.

According to a preferred embodiment, the system includes devices for defining a plurality of earlier positions of the motor vehicle, a preferred display detail can be defined in the environment of the motor vehicle at least as a function of this plurality of earlier positions, and the environmental or surrounding detail can be adapted such that essentially this display detail is displayed. By taking into account a plurality of earlier positions of the motor vehicle, the environmental detail can be adapted in a particularly advantageous manner.

As discussed above, each individual earlier position can be constructed as a point, a surface or a volume. Accordingly, the plurality of earlier positions can basically be constructed as a point set, as a line, as a quantity of individual surfaces, as a tube-type surface, as a quantity of individual volumes or as a tube-type volume. Without limiting the generality, the case of point-shaped earlier positions will be considered in the following. The plurality of earlier positions is therefore constructed as a point set or line.

The above-mentioned plurality of earlier positions may be constructed or be present, for example, as a trajectory of the motor vehicle. Such a trajectory may describe the covered moving path of the motor vehicle continuously, quasi-continuously or as a set of values. For limiting such a set of values or sequence of values, particularly always the most recent part of the covered path may be recorded or stored in a ring buffer or in another storage unit, in which older values can be overwritten.

The above-mentioned display detail may be understood to be a desired environmental detail. Provided that it is permitted by the prevailing technical conditions of the system, the environmental detail can be adapted such that it corresponds exactly to the display detail. The environmental detail will then be defined or adjusted directly as a function of the plurality of earlier positions. However, as required, cutbacks or croppings should be made in a targeted manner in this respect, and the environmental detail will only essentially be adapted such that it corresponds to the display detail.

In the simplest case, the display detail can be defined as relative to the direction with respect to the current vehicle alignment. However, the direction may, for example, also be supplemented by a zoom factor.

The earlier positions can be defined and/or processed as absolute positions. In this case, for example, position data of a satellite-supported system for position determination (such as GPS) can be used. In such a case, the preferred display detail is preferably also at least at first defined in an absolute manner. A preferred display detail that is defined in an absolute manner can then, when the current vehicle position and, as required, the vehicle alignment are known, be converted to a preferred display detail defined relative to the current vehicle position and, as required, the vehicle alignment.

As an alternative, earlier positions may be defined and/or processed exclusively relative to positions relating to the current motor vehicle positions and, as required, alignments. For the determination of such relative values, particularly steering angle signals, speed signals, and/or acceleration values, for example, measured by a gyroscope, can be used.

According to a preferred embodiment, the display detail is defined such that certain given criteria to be met in connection with the earlier positions will be met in the best possible fashion. For example, it may be defined as a criterion that all positions which the motor vehicle has taken up on a certain already traveled driving route of a predefined length (for example, one meter multiplied by the current speed measured in kilometers per hour) should be contained in the display detail or in the environmental detail. It may be a further criterion that the display detail or the environmental detail is to be selected to be as small as possible in order to offer a good representation of the detail. When the display detail or the environmental detail can be adjusted by way of the two parameters, i.e., directions and zoom factor, an optimal value of these parameters exists as a rule, for which the whole of the two criteria is met in the best possible manner.

As a complete alternative to such a criterion, for example, a center of gravity of the plurality of earlier positions can be determined. The display detail or the environmental detail can then be defined such that this center of gravity is situated in the center of the display detail or of the environmental detail. As a function of the distance of the center of gravity from the motor vehicle, a zoom factor of the display detail or of the environmental detail can be defined.

According to another preferred embodiment, the display detail or the environmental detail is defined such that, with respect to time, it is delayed in comparison to a fictitious display detail or environmental detail defined in a constant manner relative to the vehicle. Such a time delay, which, for example, may be in the order of one second, may, for example, in the event of a considerable change of direction of the motor vehicle, have the effect that the display detail and therefore also the displayed environmental detail will at first still be maintained in the manner that existed before the change of direction. As a result, a vehicle that may possibly be following does not immediately disappear from the displayed environmental detail when the own motor vehicle changes its direction but it can, for example, be observed whether this following vehicle also sets its turn signal or whether it emits other visual signals (for example, a flasher) in order to perhaps warn the motor vehicle equipped with the system of a danger with respect to the turn. Such a delay may also be advantageous in connection with a defining of the display detail or environmental detail according to other criteria.

According to another preferred embodiment, the display detail or the environmental detail is defined such that its temporal course is low-pass filtered with respect to a fictitious display detail defined in a constant manner relative to the vehicle. Thus, a high-frequency part of the vehicle motion is filtered out or compensated. For example, in a rapidly driven hairpin turn or during a fast lane change of the motor vehicle, the low-pass filtering can prevent that the driver loses the overview over the rearward area of the vehicle environment. Such a low-pass filtering may also be advantageous in connection with a defining of the display detail or of the environmental detail according to other criteria.

In the case of many contemplated algorithms for defining the display detail or the environmental detail, a low-pass filtering and also a time delay, just based on the principle, are already caused by taking into account the earlier positions of a past time interval of a defined length.

In particular, this effect can be reduced in that the earlier positions, as a function of their past and/or their distance from the current vehicle position, are entered into the determination of the preferred display detail or environmental detail with a different weighting and in the process more recent values are weighted to a greater degree. Other filtering effects can also be achieved when the earlier positions, as a function of their past and/or their distance from the current vehicle position, are entered into the determination of the preferred display detail or environmental detail with a different weighting.

The preferred display or environmental detail is preferably defined according to a quality assessment. In this case—as mentioned above—it can be evaluated as to whether and/or where the earlier positions of the motor vehicle are contained in the display detail or environmental detail.

In the simplest case, it is only evaluated whether certain earlier positions of the motor vehicle are at all contained in the display detail or environmental detail. The display detail or the environmental detail can then, for example, in most cases be unambiguously defined on the condition that a zoom factor is to be selected that is as small as possible, and the viewing direction is to be selected such that the most extreme earlier positions to be displayed are situated just in the edge area of the display detail or the environmental detail.

As an alternative or in addition, for evaluating whether earlier positions are contained in the display detail or environmental detail, an evaluation can also take place as to where the earlier positions are contained in the display detail or environmental detail. In this case, as required, it may even be accepted that an earlier position to be displayed per se is not contained in the display detail or environmental detail if other earlier positions are displayed all the better.

If the display detail or environmental detail, which deserves a maximum or a satisfactory value of the quality assessment, can be determined directly, the display detail or environmental detail is preferably correspondingly defined in a direct manner. Otherwise, as required, the display detail may be definable by a search step process or another optimization process.

In the following, for reasons of simplicity and without limiting the generality, a differentiation will no longer be made between a display detail and an environmental detail. However, for the following statements, the fact should also be regarded as being disclosed that, although an environmental detail is defined in a certain manner, the actually effectively adjusted environmental detail does not always exactly correspond to the latter.

In addition to being a function of the at least one earlier position of the motor vehicle, the adaptation of the environmental detail preferably also takes place as a function of the driving speed of the motor vehicle. At a low driving speed, for example, during parking maneuvers, especially a wide-angle environmental detail may provide an improved overview. In contrast, at a higher driving speed, an environmental detail with a narrow-angle focus may be helpful for an improved view into parts of the environment that are farther away.

It may be advantageous for the adaptation of the environmental detail to take place as a function of at least one future position of the motor vehicle, in addition to the at least one earlier position of the motor vehicle. In particular, the preferred display detail can be defined as a function of a predicted position or possibly a predicted spatial alignment of the motor vehicle. The prediction may extend ahead by a predefined time period or a predefined driving route of the motor vehicle. It may take place, for example, by means of the current driving speed and/or the current steering angle. Longitudinal and lateral acceleration values may also be taken into account for an improved prediction.

According to a particularly preferred embodiment, the system according to the invention includes devices for determining a plurality of earlier steering angle values of the motor vehicle. A preferred display detail in the environment of the motor vehicle can be defined, at least as a function of the plurality of earlier steering angle values. In particular, the steering angle values may be used as an essential or even sole basis for the determination of earlier positions of the motor vehicle, by which the environmental detail can then be defined. The past steering angle values permit at least an approximate determination of the past lane of the motor vehicle relative to its current position. Because they are supported by steering angle values, the measuring equipment and measuring-related algorithms for implementing the invention may have a particularly simple design and nevertheless effectively implement the invention.

According to another particularly preferred embodiment, the at least one earlier position is determined, among others, by use of electronic map data. In particular, a complete past trajectory of the motor vehicle or parts of such a trajectory can be determined by way of the road courses known from an electronic road map. It is also contemplated to amend or correct a trajectory by way of the course of roads known from an electronic road map when the trajectory otherwise obtained in a different manner is interrupted as a result of measuring errors or does not appear to be plausible.

In addition to being a function of the at least one earlier position of the motor vehicle, the environmental detail can preferably automatically be adapted to the vehicle environment as a function of additional state variables of the vehicle environment, depending on the situation.

An adaptation of the environmental detail is also contemplated, for example, as a function of known sources of danger or other traffic participants. The previous knowledge of danger sources required for this purpose may also originate from an electronic road map. It may also be obtained in a wireless manner from a service provider. The presence and, as required, the precise position and/or additional data of other traffic participants may be made known to the motor vehicle, for example, by way of vehicle-to-vehicle communication and/or vehicle-to-infrastructure communication.

When another traffic participant, particularly another vehicle, is equipped with an RFID chip or other features that can be sensed, this traffic participant can also be detected and localized by the motor vehicle or an infrastructure device on the basis of the detection of this chip. According to the situation, the alignment of the imaging devices and/or of the image detail can then, for example, as a function of a danger potential attributed to the other traffic participant, be adapted such that the displayed environmental detail includes the other traffic participant.

While driving past, other objects and conditions of the vehicle environment can also be detected on an RFID basis, in addition to other traffic participants. For example, the RFID-based detection and possibly localization of traffic signs, intersections, junctions, traffic lights and parking opportunities is also contemplated. According to the situation, the environmental detail can also be adapted as a function of such objects and their arrangement with respect to the motor vehicle.

The RFID detection can also concern objects which do not relate directly to the driving events, such as mailboxes, restaurants, cigarette vending machines, etc. According to the situation, the environmental detail can also be adapted such that such objects are indicated to the driver. Thus, for example, a vacant parking space in the vehicle environment can be displayed to the driver.

In addition to the RFID-induced adaptation of the displayed environmental detail, at least one piece of information read out of the respective RFID chip concerning the object equipped with the RFID chip can also be displayed by the display unit provided according to the invention. When the read-out information is inserted into the image detail in the proximity of the object, the driver can particularly well mutually relate the information and the object. Instead of the display of the information by the display unit, the indication of the information can naturally also be caused by another information conveying device.

As mentioned above, the image detail can be adapted such that a vacant parking space is displayed to the driver in the shown environmental detail. In addition,—inserted into the image of the environmental detail or at another point in the vehicle interior—, it may be read out of the RFID chip as further information and displayed to the driver which parking fee would be due for use of the parking space. It would also be advantageous for information to be read out of an RFID chip of another vehicle in the environment of the motor vehicle concerning a priority of the other vehicle (for example, "Baby on Board" or "service vehicle") and to be conveyed to the driver of the motor vehicle. The driver can then let such a vehicle pass and/or thoughtfully maintain a distance.

The situation-related definition addressed in the preceding section may compete with the basic definition of the environmental detail according to the invention. Preferably, a weighting of different influencing variables when defining the environmental detail can therefore be adapted by operating actions of a vehicle occupant. In particular, it may, for example, be advantageous to define a threshold which a mathematical measurement of the relevance of a traffic situation has to exceed so that a definition of the environmental detail takes place as a function of this traffic situation. If the threshold is not exceeded, the environmental detail is adapted as previously as a function of at least one earlier position of the motor vehicle.

According to an advantageous further development, the playback of the image detail—and therefore also the display of the environmental detail—takes place as a function of the position of the environmental detail with respect to the motor vehicle. The viewer is thereby given the opportunity of orienting and integrating the displayed environmental detail in the overall environment. As an alternative or in addition, the display of the environmental detail may also be accompanied by a symbolic representation of the position of the environmental detail with respect to the motor vehicle. In principle, those forms of display are to be considered to be advantageous also for other imaging devices and processes where a detail from the environment of the motor vehicle is automatically defined and is displayed to a viewer in the vehicle interior.

A display of the environmental detail as a function of a zoom factor or aperture angle used for the definition or resulting from the definition may also be advantageous. This also may allow the viewer to have an improved orientation and integration of the displayed image detail in the overall environment. As an alternative and addition, information concerning the zoom factor or the aperture angle can be additionally conveyed to the viewer by an accompanying symbolic representation.

According to a preferred embodiment of such further developments of the present invention, the arrangement of the image detail within a display surface of the display unit is a function of the position of the environmental detail with respect to the motor vehicle. In particular, the display unit may be integrated in the mirror surface of a rearview mirror of the motor vehicle. The display unit itself may also be constructed as a mirror surface of the rearview mirror, and the display surface in each case currently not used for displaying the environmental detail can be changed to a reflective condition. In the case of such an embodiment, the viewer can easily recognize by means of the arrangement of the picture detail within the mirror surface which part of the environment is just being displayed to him. The remaining parts of the mirror can be conventionally used by the driver as a mirror.

As an alternative or in addition, a distortion of the image detail may be dependent on the position of the environmental detail with respect to the motor vehicle. This also can permit the viewer to better orient and integrate the displayed environmental detail in the overall environment. The distortion can be achieved by a geometrical transformation of the image detail which provides the viewer with the impression of a corresponding perspective. As an alternative or in addition, the distortion can be achieved by a curvature or a perspectively generated virtual alignment of the image detail.

As an alternative or in addition, the image detail may be arranged as a function of the position of the environmental detail with respect to the motor vehicle and/or as a function of the zoom factor used in a defined plane of a three-dimensional representation.

According to another advantageous further development, a change of the environmental detail caused by a pitching or rolling motion of the motor vehicle can be compensated by an opposite adaptation of the image detail. For example, a displayed view of the rear space is therefore not corrupted by a pitching of the vehicle during strong braking. A measurement or estimation of the disturbance variables to be compensated will be helpful for an implementation.

The macroscopic course of the road traveled by the motor vehicle can also be compensated. So that, for example, another vehicle driving behind the motor vehicle can be included in the environmental detail, it is not sufficient to compensate the pitching and rolling motions of the motor vehicle with respect to a road surface approximated as a sole plane surface. When the motor vehicle is, for example, at first driving on an essentially planar road and then suddenly briefly slopes toward the rear while it is driving up a locally narrowly bounded incline, on the one hand, the slope of the motor vehicle with respect to the local road surface has to be compensated, and, on the other hand, the incline and altitude of this local road surface with respect to the plane in which the following vehicle is still situated has to be compensated. Such data may be known from electronic map data of a navigation system. As an alternative, provided that the motor vehicle has the corresponding suitable detecting devices, the absolute altitude and the absolute pitching angle of the motor vehicle with respect to space can also be determined. When, in addition, the earlier position to which the environmental detail is to be adapted is spatially known in an absolute manner, the imaging devices and/or the image detail can be correspondingly adapted.

According to another advantageous further development, a change of the environmental detail caused by a vibration of the motor vehicle can be compensated by an opposite adaptation of the image detail. The image sequence of a view of the rearward space can therefore be electronically stabilized, for example, during a drive over cobblestone pavement which causes the entire vehicle and therefore also the imaging devices to vibrate. A measurement or estimation of the disturbance variables to be compensated will be helpful for an implementation.

According to another advantageous further development, the image detail is at least temporarily compressed at least in an edge area with respect to a central picture area in order to cause a representation of the environmental detail, which corresponds to the representation by a non-spherical mirror. Thus, the entire angle of view can be enlarged without reducing or distorting the image in the central picture area.

According to another advantageous further development, the system includes devices for determining an eye position and/or viewing direction of the operator and the environmental detail can be adapted as a function of this eye position and/or viewing direction. Thus, in particular, the driver is provided with the possibility of interacting with the system in the same fashion to which he is accustomed when using a conventional mirror. For example, a change to a more wide-angled representation can take place when the driver's eyes approach the display unit. As required, this effect may also be intensified superproportionally. As a result, the driver is even provided with a possibility of interacting with the system, which is improved or expanded in comparison with the use of a conventional mirror. Nevertheless, because of the similarity of the interaction possibilities, this function of the system can be intuitively used by most drivers in a targeted manner and without any significant familiarizing phase. It may, however, also be advantageous to increase the zoom factor when the driver's eyes approach the display unit. This may also correspond to some users' expecting attitude and can therefore be used intuitively by those users in a targeted manner and without any significant familiarizing phase. Instead of the eye position, the user's, particularly the driver's, head position can be detected if this can be technically implemented in an easier fashion.

According to another advantageous further development, the system includes devices for illuminating the vehicle environment, and the illumination of the vehicle environment is controlled as a function of the currently displayed environmental detail. Thus, particularly by means of targeted light sources and their alignment with the environmental detail, that part of the vehicle environment can always be illuminated in a targeted manner that actually also appears to the driver in the display. This goal can naturally also be reached if, as a function of the at least one earlier position of the motor vehicle, the illumination of the vehicle environment is controlled such that the currently displayed environmental detail is illuminated in a certain manner, for example, is brightly as possible.

For the illumination, the normal motor vehicle lights (particularly the low beam, the high beam and/or the backup lights) can be used as required if their light can be aligned and/or redistributed. Particularly in this case and in other cases of the use of visible light, the change of the illumination of the vehicle environment can contribute to the fact that the environmental detail can be displayed by the system according to the invention in an improved manner and that also the driver and other traffic participants can better observe it directly.

The illumination of the environment can also be further developed in the infrared spectrum when the imaging devices used according to the invention operate in the infrared spectrum. In this case, other traffic participants will not be irritated by the illumination change of the environment.

The inventive idea can basically be applied to all systems for monitoring the environment or surroundings of a motor vehicle, which are suitable for pictorially representing to the driver a detail of the environment and for technically implementing the characteristics of the invention. Systems capable of providing a pictorial detail of the vehicle environment which can be displayed to the driver can be intermediately summed up by the term "imaging systems". In this sense, the imaging systems include those that are based on camera images (also infrared) as well as those that are based on synthetic or virtual images (as required, also with a vehicle environment illustrated by symbols) and that are generated, for example, by scanning the environment by use of a radar system, a LIDAR system or a similar detection device. An object in the environment of a motor vehicle can also be detected because it has an RFID chip or a similar detectable feature. Such an object detected on an RFID basis could, for example, be plotted into an environmental image otherwise artificially generated on a radar basis. Also cases of a real-time image generation on the basis of a sensing of the environment should be included in the used term "taking an image sequence by means of imaging devices". An imaging system in the above-mentioned sense may also consist of several cameras and/or other sensors whose images are assembled into a single picture.

The invention can also and particularly be used for motor vehicles constructed as motorcycles. For motorcycles, it is generally considered to be advantageous to be able to provide a display unit that is as small as possible. Larger displays can only be shielded with difficulty from environmental influences, particularly sun radiation. The invention permits a reduction of the size of the image to be displayed for providing detailed information and is therefore suitable especially for motorcycles. Based on their principle, the compensation of a pitching, yawing and rolling can be considered to be particularly advantageous in the case of motorcycles.

Systems and processes for storing the taken image contents in a storage unit of the motor vehicle—for example, for an evaluation after an accident—can also be improved as a result of the invention. The reason is that, by way of the invention, the environmental information in each case classified as relevant can already be extracted by a definition of the displayed environmental detail. As it were, the image detail is optimized with respect to the size and the content. If the corresponding image detail is stored, for example, in a ring storage device, the stored data will have a very high informational content.

The automatic adaptation of the photographed part of the vehicle environment and/or of the image detail is preferably carried out by a display control unit contained in the system according to the invention. The display control unit may, for example, be constructed as a motor vehicle control unit. In an advantageous embodiment, the display control unit can carry out additional tasks which are connected with the invention and/or are not connected with the invention.

In the following, preferred embodiments of the invention will be described by means of the attached drawings. This description contains further details, preferred embodiments and further developments of the invention. The described examples, embodiments and further developments, unless indicated otherwise and/or technically excluded, can be used individually as well as in any combinations with one another and are advantageous.

DETAILED DESCRIPTION OF THE DRAWINGS

Figure 2:
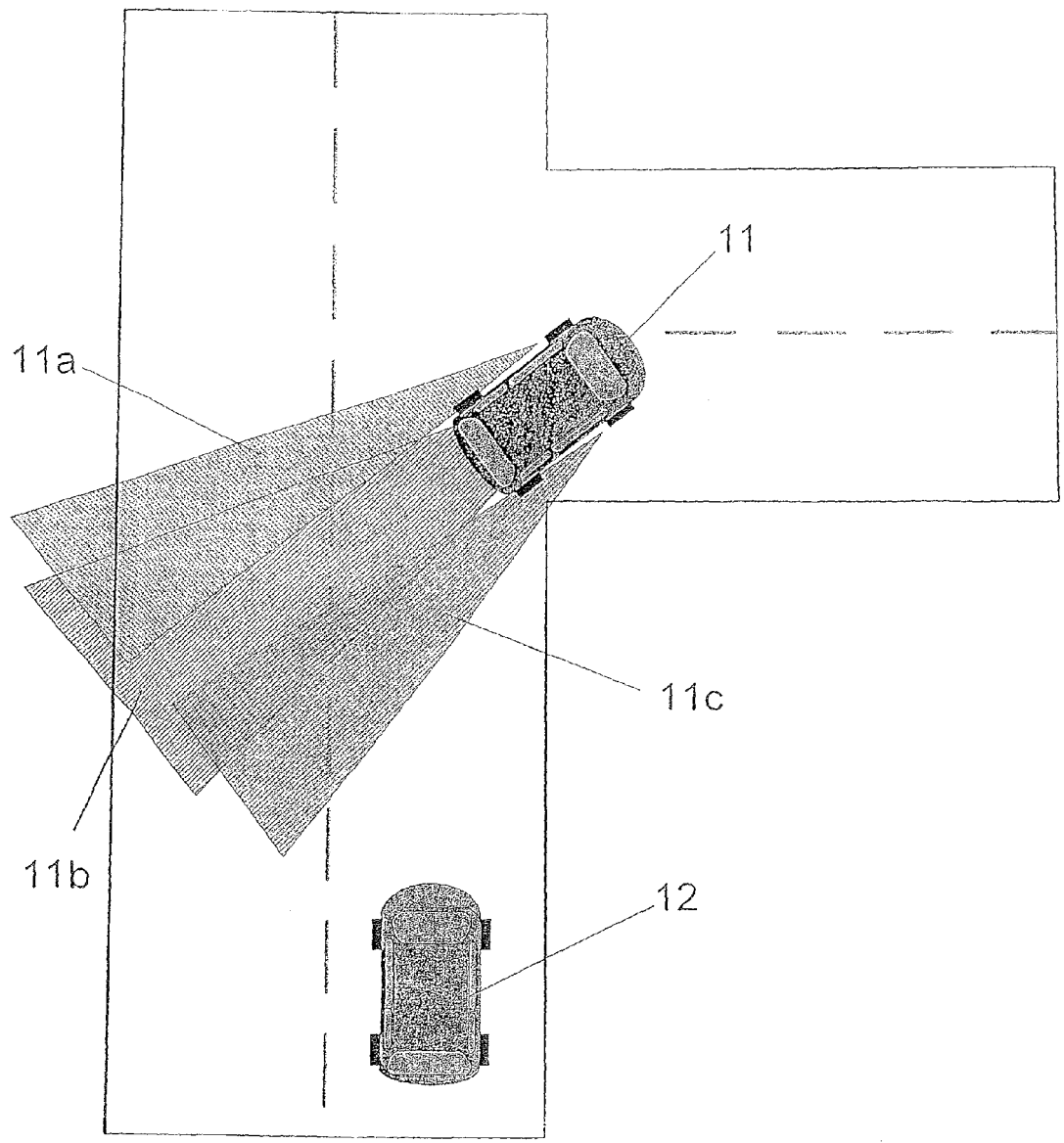
FIG. 2 is a view of a second traffic situation in which a conventional mirror system permits insufficient monitoring of the vehicle environment or surroundings.

The conventional rearview mirrors of a motor vehicle permit a good view of a certain detail of the vehicle environment, which is defined by a constant aperture angle and an adjustable (by adjusting the mirror) direction relative to the motor vehicle. FIG. 2 illustrates the typical "viewing angle details" 11a, 11b, 11c, which are made available to the driver of a motor vehicle 11 by conventional rearview mirrors (for example, interior and side rearview mirrors).

Figure 1:
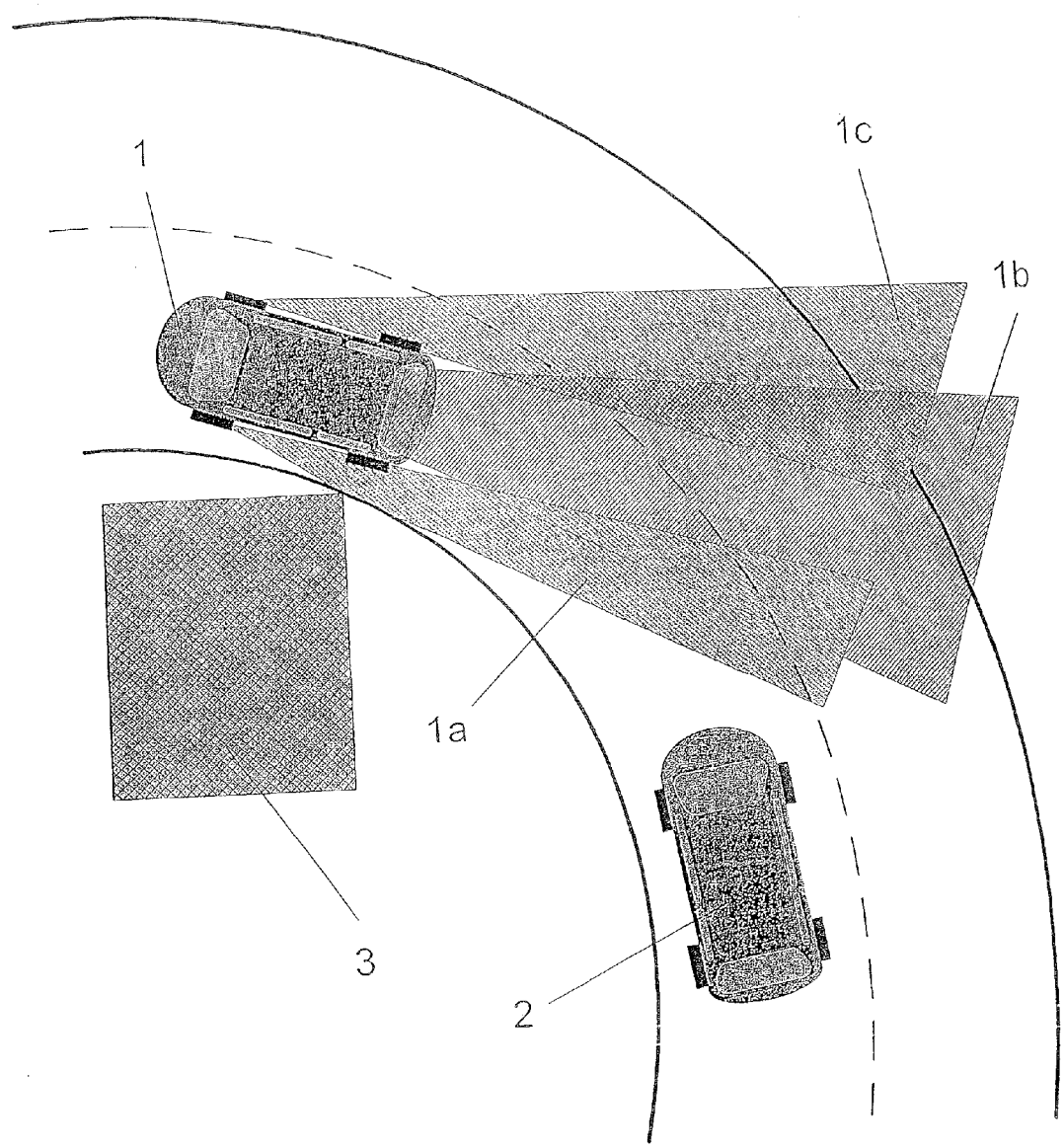
FIG. 1 is a view of a first traffic situation in which a conventional mirror system permits insufficient monitoring of the vehicle environment or surroundings.

However, the typical installation site of the mirrors in the forward area of the motor vehicle does not permit the seeing of objects, particularly other motor vehicles, which are situated behind a turn with respect to the installation position of the mirrors. Referring to FIG. 1, the obstacle 3, for example, obstructs the view of a vehicle 2 that is following, for the driver of a vehicle 1, although the viewing angle details 1b and 1c are fully available to the driver. However, the "viewing angle detail" 1a is trimmed by the obstacle 3. This circumstance increases the risk of accidents in turns, when driving out of parking spaces (particularly at a right angle) and in other similar situations. Also in other situations, particularly when turning off at an acute angle, for example, at an intersection, and during turning maneuvers, the detail of the vehicle environment visible in the mirrors is of only limited benefit to the driver with respect to his direction. For example, the driver of vehicle 11 in FIG. 2 also does not see vehicle 12 that is following, because the viewing angle details 11a, 11b, 11c of his rearview mirrors rotate in space during the turn by the vehicle 11.

For eliminating such problems, it is known to use imaging devices, such as cameras, and to display images (pictures) of the vehicle environment, which are covered by means of such devices, at least as details in the vehicle interior.

In order to cover a large potentially relevant area of the vehicle environment, the imaging devices known from the prior art are, as a rule, dimensioned to be very wide-angled. However, a wide-angle imaging device with a large aperture angle for covering a large potentially relevant area of the vehicle environment also has considerable disadvantages. On the one hand, a directly reproduced wide-angle picture, as a result of an unnatural perspective, makes orientation difficult and requires a large video screen surface so that objects are displayed in a sufficient size in order to also make details visible. On the other hand, the distance of the vehicle from other objects, particularly from movable objects, can often not be correctly estimated by means of a wide-angle image. Approaching objects, which are far away at first, will, for a long time, still be shown to be very small in the course of an approach and later will be surprisingly rapidly enlarged for the driver. In addition, during a fast drive and with a wide-angle display, the edge areas of a road shown in the picture will oftentimes be blurred.

Among other things, because of the fact that the display surfaces available and providable in the vehicle interior typically have very small dimensions and that the number of driver assistance functions requiring an image playback is constantly increasing, it has been suggested to display only an image detail of an image sequence that contains images of at least one part of the environment by means of a display unit in the vehicle interior. The approach of providing devices for the automatic change of the environmental detail shown by the display unit is also known.

In contrast, the issue of the optimal definition of the environmental detail shown by the display unit has not been satisfactorily solved.

For solving this issue, an adaptive system of the above-mentioned type is suggested, which is further developed such that the displayed environmental detail is essentially aligned with the road section last traveled by the motor vehicle.

The system according to the invention therefore has precisely the capability that a conventional rearview mirror lacks in certain above-described situations (for example, when turning off at an acute angle). Traffic safety and the comfort of the driver of the motor vehicle are increased as a result of the invention because the driver can still see a vehicle that is following even in those situations.

In the present example, the imaging device surely is not aligned mechanically for defining the environmental detail but a detail from an image or sequence of images taken at a wide angle is adaptively extracted solely at the level of the signal processing following the actual image acquisition. As it were, a purely virtual camera pan takes place when the selected image detail in the image or image sequence acquired at a wide angle is displaced. As required, additionally, a virtual or digital zoom takes place when the selected image detail in the picture or sequence of pictures acquired at a wide angle is selected to be larger or smaller. In this case, depending on the embodiment of the invention, the wide-angle image and also the extracted image detail can also be created in that the pictures of several imaging devices are mutually switched or mixed.

The system described in the present embodiment is further developed such that the selection of the displayed lens coverage of the imaging device, i.e., of the image detail, takes place as a function of the vehicle coordinates at at least one earlier point in time. This is a considerable advantage particularly when the vehicle carries out a complex driving maneuver. If, for example, because of a sudden evasive maneuver, the motor vehicle were to drive slalom-like turns, the driver would have a very unsteady view of the environment which will be moving considerably back and forth in a conventional rearview mirror of the motor vehicle. An attempt by the driver to orient himself in such a situation by means of the image in the rearview mirror could even contribute to disorienting the driver. Instead, the environmental detail to be displayed by the display unit in the present example is defined such that several (in the present example, exactly four) precisely defined former vehicle positions are contained in the displayed image. These may, for example, be the vehicle positions which, on the trajectory of the vehicle, are situated 5 meters, 10 meters, 15 meters or 20 meters of real driving route, behind the current position. For determining these vehicle positions which should/must be contained in the displayed environmental detail, the current vehicle position can be continuously determined by a satellite-supported system for the position determination (GPS, Galileo, etc.), and the position values of at least the last 20 meters of driving route are stored in a short-term storage device. For detecting the driven driving route, especially the wheel sensors of the vehicle are used.

Figure 3:
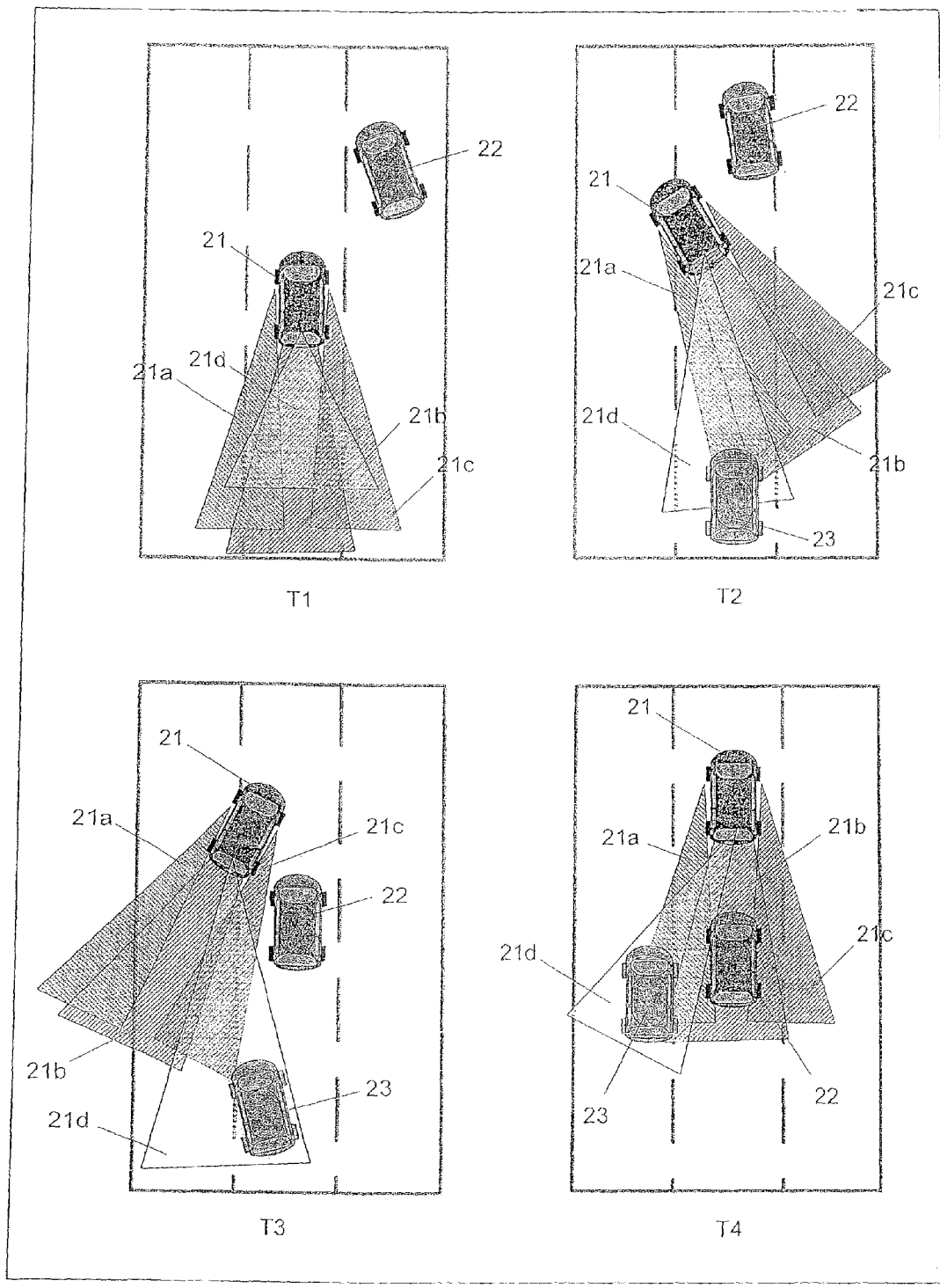
FIG. 3 is a view of a sequence of several one-shot displays during a passing operation of a motor vehicle which is equipped with a preferred embodiment of the system according to the invention.

By means of a sequence of snapshots at the points in time T1, T2, T3 and T4, FIG. 3 illustrates that a motor vehicle 21, which evades a vehicle 22 surprisingly changing the driving lane, during this evasive maneuver, can keep observing a vehicle 23 that follows in this manner (viewing angle detail 21*d*). In contrast, with conventional rearview mirrors (viewing angle details 21*a*, 21*b*, 21*c*), the vehicle 23 that is following would disappear from the driver's view. Particularly at the points in time T2, T3 and T4, the viewing angle detail 21*d* defined by means of the former vehicle position will clearly deviate, particularly with respect to its alignment with the vehicle, from the viewing angle details 21*a*, 21*b*, 21*c* of the conventional rearview mirrors.

Figure 4:
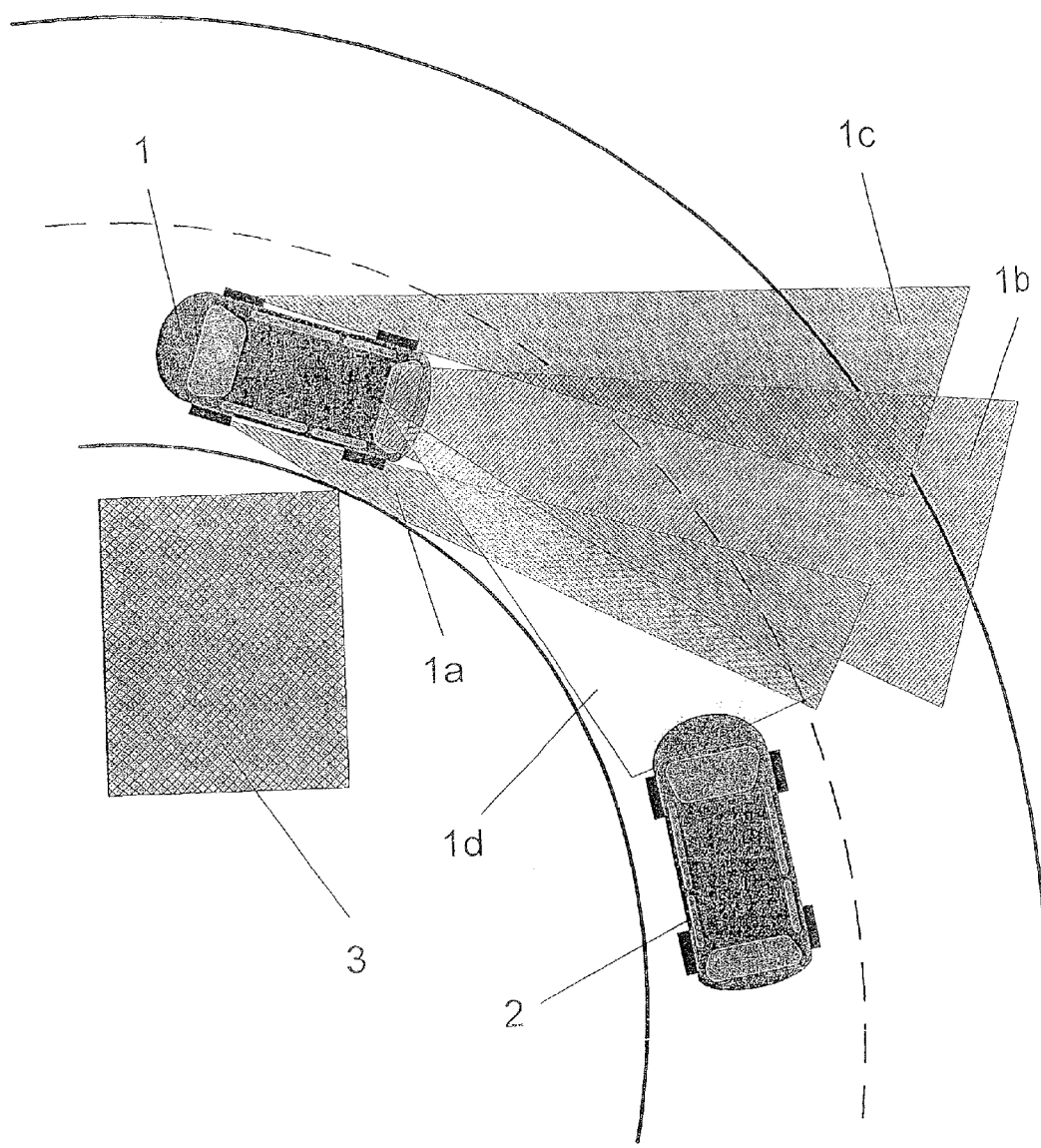
FIG. 4 is a view of a traffic situation corresponding to FIG. 1 while using a preferred embodiment of the system according to the invention.

FIG. 4 illustrates the traffic situation from FIG. 1 now with the additional use of such a system. The viewing angle detail 1*d* adapted according to the invention allows the driver of the motor vehicle 1 to keep the vehicle 2 that is following in his view.

Figure 5:
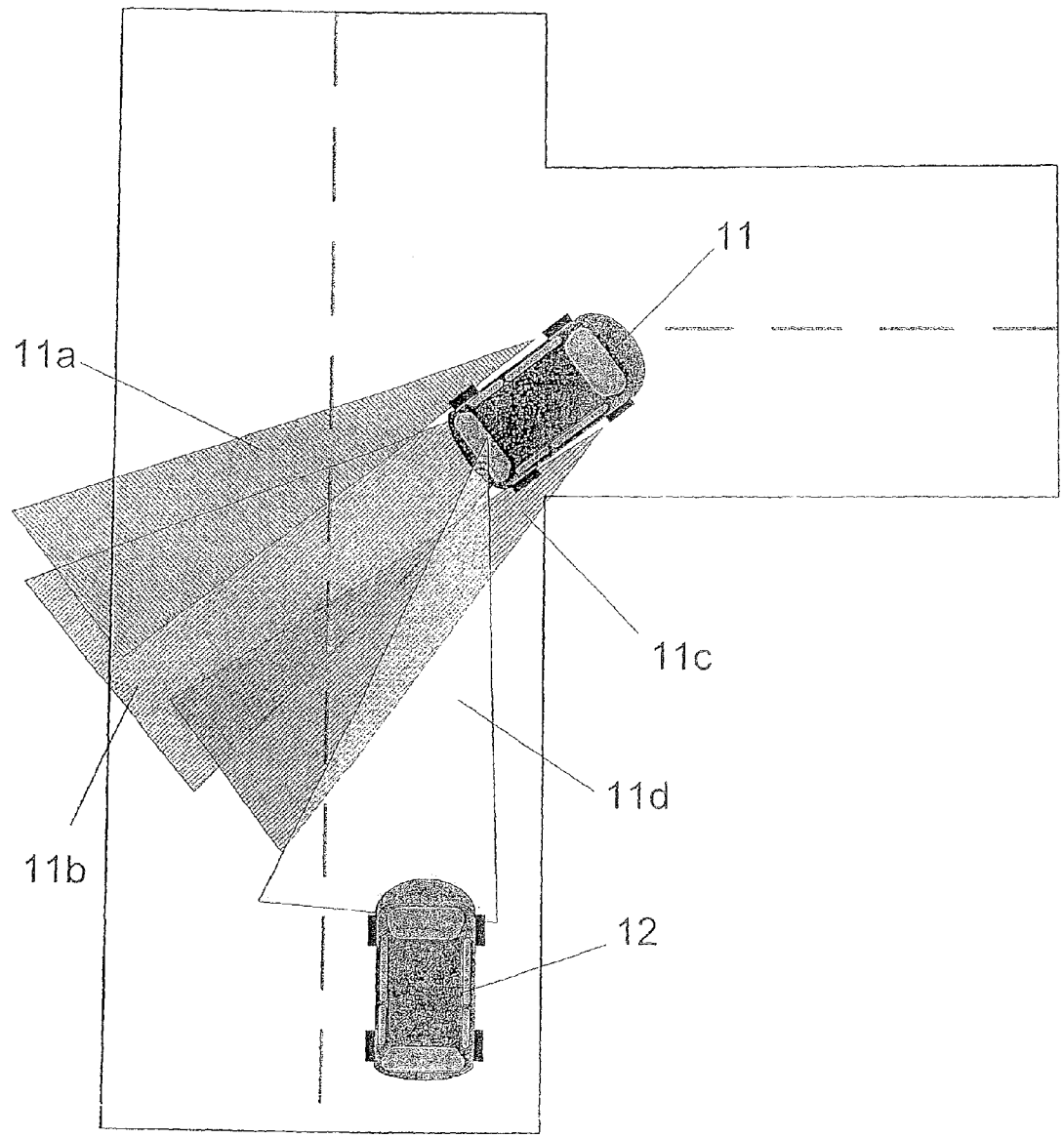
FIG. 5 is a view of a traffic situation corresponding to the traffic situation from FIG. 2, using a preferred embodiment of the system according to the invention.

FIG. 5 illustrates the traffic situation from FIG. 2 now with the additional use of such a system. The viewing angle detail 11*d* adapted according to the invention allows the driver of the motor vehicle 11 to keep the vehicle 12 that is following in his view.

The system described in the present embodiment is further developed such that the displayed environmental detail is defined particularly by the direction angles between the longitudinal axis of the vehicle (any other vehicle-fixed reference axis could also be used) and the earlier vehicle positions.

In the present embodiment, the motor vehicle includes devices for the determination of the alignment of the vehicle for this purpose. This alignment is continuously determined, preferably just like the vehicle position, and is stored in a short-term storage device—preferably the same short-term storage device in which the position values are also stored. It is particularly favorable to assign the alignment values to the respective position values already during the storing in the short-term storage device. However, otherwise, the assignment may also take place subsequently, for example, by way of identical or similar time stamps.

Here, the definition by means of the direction values takes place by an interpolation formula between the angle values of the individual earlier vehicle positions. In this case, the respectively newest values are weighted higher than the respectively older values which, however, are nevertheless taken into account.

In the case of another embodiment of the present invention which is not discussed here in detail, instead of a rigid definition of the earlier vehicle positions as those positions which are situated back 5 meters, 10 meters, 15 meters and 20 meters of real driving route on the trajectory of the vehicle with respect to the current position, the part of the past trajectory taken into account may be defined as a function of the current speed of the vehicle. The consideration can then reach back, for example, up to 50 meters in the case of a faster drive, while when the drive is slower, only the last 10 driven meters are considered.

In the present embodiment, the aperture angle is basically selected to be only so large that all considered earlier vehicle positions can be shown in the environmental detail. It is therefore basically kept as small as possible. However, in exceptional cases, another aperture angle may be selected for taking into account other areas of the environment that are worth displaying. In the event that the considered earlier vehicle positions are situated essentially on a straight line, for example, when driving straight ahead, a lower limit of, for example, 15 degrees is provided for the aperture angle in the present embodiment.

Likewise, an upper limit can be defined which prevents details of the environment from being displayed too small. Under certain circumstances, not all considered earlier vehicle positions will actually be displayed but the environmental detail is defined such that the considered earlier vehicle positions will be covered "as well as possible".

In the case of another embodiment of the present invention not discussed here in detail, the aperture angle is also not changed abruptly but in a continuous manner by using an interpolation formula. The interpolation formula used in this case may essentially correspond to the above-mentioned interpolation formula for calculating the direction angle.

It should be noted that a navigation system with an electronic road map is not absolutely required for defining the environmental detail by means of the direction angles with respect to earlier vehicle positions. This permits a very simple implementation of the invention which can also be practiced in less well equipped vehicles. A pure locating system which, as a rule, can be provided much more cost-effectively than a navigation system, for example, will also essentially be sufficient for controlling the picture selection, so will the odometric data of the motor vehicle (speed, driven route from wheel sensors), which, as a rule, will be available anyhow.

If, in addition, the steering angle of the vehicle is analyzed, not even a system for an absolute locating is required. Conclusions can then be drawn completely by use of odometric data concerning the direction angles of the earlier vehicle positions relative to the current vehicle alignment and concerning the distances of the earlier vehicle positions relative to the current vehicle position.

In the case of another embodiment of the present invention not discussed here in detail, the aperture angle can be defined as a function of the driving speed. A variably selected environmental detail will then be displayed to the driver, the size of which environmental detail (meaning the size of the covered area of the environment) depends on the vehicle speed. The optimal aperture angle for perceiving and interpreting the environment by the driver will differ at different speeds. As a result of the speed-dependent definition, a relatively wide-angle overview can be displayed to the driver at a low speed (for example, a maneuvering speed), which overview supplements the conventional mirror image. In contrast, at a high speed (such as an expressway speed), the aperture angle is automatically limited. The enlargement of faraway objects is thereby increased. This function may be implemented purely electronically (without any optical zoom).

In addition, instead of a direct change of the aperture angle as a function of the driving speed, only an upper or lower limit for the aperture angle may be varied as a function of the driving speed. As mentioned above, a bottom limit for the aperture angle is provided in the present embodiment. Likewise, an upper limit is provided. This upper limit should also not be exceeded when all earlier vehicle positions to be taken into account would only be coverable by a still larger aperture angle. When the limitation by the upper limit intervenes, the earlier vehicle positions will be covered "as well as possible" by the use of a quality measurement. This upper limit, as well as the mentioned lower limit, is defined in the present embodiment as a function of the driving speed. This contributes to the fact that, although the solid angle most important to the actual traffic situation is displayed, its size (meaning again the size of the covered area of the environment) should not be permitted to be too large, particularly because of the typically limited available display surface. By providing an upper limit of the aperture angle, which decreases with an increasing speed, it can, for example, be achieved that, during a fast drive, a motor vehicle that is following is not displayed to be too small. This also applies when the fast drive takes place on a winding road and the earlier vehicle positions which are therefore scattered into various directions would "actually" require a larger aperture angle in order to be able to be covered.

The aperture angle can optionally also be changed as a result of the driver's operating action.

In the case of another embodiment of the present invention to be only briefly discussed here, the selected environmental detail can be displayed as a function of the steering angle of the vehicle at at least one point in time. The analysis of a history of the steering angle, for example, over the last 20 driven meters, is particularly advantageous. Earlier vehicle positions relative to the current vehicle position can easily be determined therefrom, as required in connection with the driving speed and data of the wheel sensors. However, an actual explicit determination and analysis of such earlier vehicle positions must not necessarily take place in order to achieve an advantageous adaptation of the environmental detail. Even a simplified system, while directly taking into account the steering angle, for example, on the basis of a characteristic diagram and, as required, in connection with the driving speed and data of the wheel sensors, can effect one of the significant advantages intended by the invention, in the case of an appropriately defined characteristic diagram, specifically a definition of the environmental detail such that the last traveled road areas can be viewed.

For example, the advantages of the invention illustrated in FIG. 4 and FIG. 5 can, for example, also be affected by use of such simple devices, exclusively while taking into account the steering angle. When, for example, the steering wheel is turned to the left, a detail of the environment is displayed which, viewed in the driving direction, is situated at the left rear with respect to the vehicle. By means of this simple rule, an environmental detail is already displayed to the driver—in the case of a suitable amplification factor between the steering angle and the direction angle—, which environmental detail, also in the case of a drive through a circular or curved turn, is aligned with the last traveled road areas behind the vehicle. In order to achieve this also for more complex, not circular or curved turns, a history of the steering angle values can be recorded and analyzed.

In the case of another embodiment of the present invention discussed here only marginally, the environmental detail displayed by the display unit is defined as a function of the previous knowledge concerning the vehicle environment. The previous knowledge may particularly relate to facts and objects which cannot be detected or are not detected by the vehicle itself. For the definition, information can, for example, be used which is obtained by means of an electronic road map and/or by means of a satellite image. This further development of the invention to this extent relates particularly to vehicles which have a navigation system. For example, information obtained from an electronic map and concerning the type of a traffic junction and/or the course of the currently traveled road can be utilized for the advantageous definition of the displayed environmental detail. This has great advantages particularly in the case of complex traffic junctions with frequent direction changes. Thus, for example, the optimal behavior of the system according to the invention can be automatically set as a function of whether the vehicle is situated in a traffic circle or is just about to enter a tunnel. According to another example, when a swerving of the vehicle is recognized, the environmental detail, while compensating for the rotation caused by the swerving, can always be aligned along the previously traveled road. The determination of the alignment of the vehicle relative to the course of the road required for this purpose can be carried out on the basis of a navigation system. Previous knowledge concerning the presence of larger objects, which could hinder the view into a certain direction relevant with respect to the traffic, and the relative position of the motor vehicle with respect to these objects can be taken into account when defining the environmental detail. The environmental detail can then be defined such that it is not "unsuccessfully" attempted to display covered parts of the environment but that instead uncovered parts will be displayed the better. For example, previous knowledge can be used concerning the presence of blocks of buildings or of tunnels in the environment of the vehicle. Such previous knowledge is already accessible on the basis of navigation maps customary on the market today. In addition satellite maps, which are made available, for example, by Internet providers, can be analyzed in order to carry out or out least influence a meaningful automatic definition of the environmental detail.

On the one hand, previous knowledge of the above-mentioned type can be utilized for covering earlier vehicle positions to an improved extent because conclusions can be drawn from the previous knowledge concerning the course of the roads and therefore the most probable earlier vehicle positions. Previous knowledge concerning the environment of the vehicle and/or additional up-to-date information can, however, also be utilized for deviating from a covering of earlier vehicle positions according to the situation, for example, for displaying an environmental detail which could represent a threat or currently is a threat.

A further embodiment of the present invention, in particular, aims at the latter cases. In this case, the adaptation of the displayed environmental detail can be optimized as a function of a predicted trajectory of the vehicle and/or its kinematic parameters with a view to a position to be expected in the near future. As it were, it will then be calculated which direction angle will be relevant at a certain point in time in the near future. On the one hand, this has the advantage that the effect of the system can be accelerated, particularly in the event that a change of direction of the imaging system—the above-addressed virtual pan—requires a relatively long time. Particularly when a radar system is used as an imaging device in the sense of the invention, it may be advantageous to at least partially compensate a certain idle time or time constant for such a pan in this manner. On the other hand, the driver himself typically requires a certain time for the interpretation of the content of such an image or sequence of images. Thus, in certain situations, this can also help the driver to react faster in that the environmental detail that will be relevant to the driver at the next moment will already be displayed at the current point in time. Particularly for the second reason, this variant of the invention will be especially advantageous when it is known—for example, from data of a vehicle-to-vehicle communication—that a certain event will occur or become visible at a future point in time.

In the case of an embodiment of the present invention, which is particularly compatible with the last-described embodiment, the displayed environmental detail is aligned with one or more directions from which other traffic participants are approaching or could approach the vehicle. Such directions can be determined particularly by means of previous knowledge of the vehicle environment, for example, from an electronic road map or a satellite map. The determination of the relevant directions (in the coordinate system of a map) can also be carried out by means of accident statistics concerning certain locations that may possibly be contained in electronic map material. When, for example, a clearly increased accident rate is known for a certain traffic circle or a certain turn, a system correspondingly further developed according to the invention may activate special solutions, for example, by use of the navigation map. In addition, it can be taken into account when one's own vehicle comes to a stop in an unfavorable traffic situation. Also, the presence or approach of other traffic participants and/or the presence of traffic signs detected on the basis of background sensors and/or wireless communication technology (radio-based car-to-car communication and/or RFID) can be taken into account. The latter can also be detected by the motor vehicle—in the case of corresponding technical equipment on the motor vehicle side and infrastructure side—just like intersections and turn-offs, not only on the basis of map data and background sensors, but also on the basis of wireless communication technologies (particularly RFID).

Figure 6:
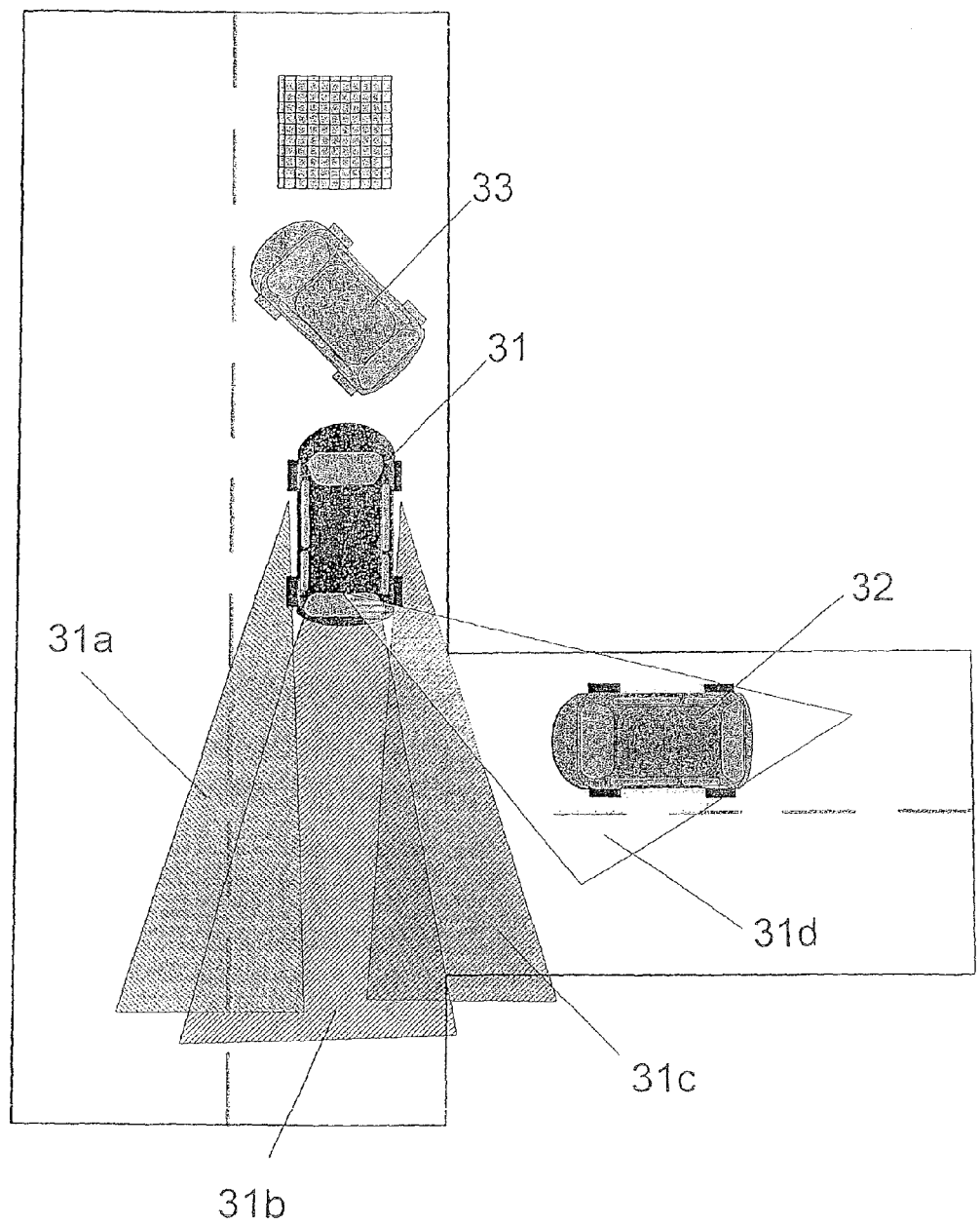
FIG. 6 is a view of a third traffic situation, using a preferred embodiment of the system according to the invention.

FIG. 6 illustrates such a situation. The continued drive of the vehicle 31 is blocked by vehicle 33. The environmental detail, which is displayed to the driver of vehicle 31 by the display unit of vehicle 31, is defined such that the viewing angle detail 31d is aligned in a direction from which other traffic participants, here vehicle 32, are approaching or could approach vehicle 31. However, vehicle 32 is not contained in the viewing angle details 31a, 31b, 31c of the conventional rearview mirrors of vehicle 31. Such a further development of the invention intervening according to the situation may, for example, be put into practice in that the current traffic situation is continuously classified and in that the reaction pertaining to a certain situation class of a system according to the invention possibly present in the case of a vehicle is determined by means of reaction data of a navigation system which comprises a satellite-supported position determination system and an electronic road map containing corresponding reaction data, and, as required, by means of the speed of the vehicle. In the case of FIG. 6, the reaction data of the navigation system would have to provide, for example, a monitoring of the side street joining from the right on which vehicle 32 is approaching in the current situation.

In the case of the other embodiment of the present invention, discussed here only briefly, the displayed environmental detail is defined or adapted by an up-to-date analysis of the traffic situation in the vehicle environment. Particularly other traffic participants and other moving objects in the vehicle environment can be taken into account in an improved manner as obstacles and sources of threats if, in certain situations, the environmental detail can be aligned with these other traffic participants or objects. Thus, in addition to his "normal" field of view, the driver's attention can be drawn to the areas of the environment momentarily relevant with respect to the traffic and he can obtain a view into these areas. A relative speed of other traffic participants with respect to one's own vehicle can, for example, be used as a criterion for the intervention of a definition by means of results of such a background analysis. Such a situatively intervening further development according to the invention, in the situation of FIG. 6, may also have the result that the viewing angle detail 31d is aligned in the direction from which vehicle 32 is approaching vehicle 31. However, in contrast to the preceding example, now this is not caused by a monitoring of the side street itself but by a pan of the displayed environmental detail targeted in the direction of vehicle 32.

In the case of another embodiment of the present invention outlined above, the displayed environmental detail is defined by a wireless communication of the vehicle equipped with a system according to the invention with at least one other traffic participant. The communication can take place directly between the vehicles or by way of an infrastructure which, as required, may also be able to transmit data of the networked vehicles in a processed fashion. By use of such a process, the approaching of another correspondingly networked vehicle can be reported as well as possibly also be automatically displayed to the driver. For the display, the system according to the invention can be used which can then select the displayed environmental detail such that the approaching vehicle will be contained in it. In such a process, a satellite communication, radio-transmitted traffic jam reports, satellite images and/or other infrastructure devices can be used as information sources. As an alternative or in addition, a sensing of the environment can take place by the system according to the invention itself and background sensors of the motor vehicles which may be coupled thereto. By means of an object detection based on the above, for example, other traffic participants moving relatively rapidly toward the trajectory of one's own motor vehicle can be detected and tracked, i.e. can be tracked by means of an adaptive definition of the displayed environmental detail.

In the case of several directions or objects to which the driver's attention is to be drawn, the display picture displayed to the driver can be electronically assembled of several relevant environmental details.

When the direction of the environmental detail to be displayed is changed with respect to the motor vehicle, the system can create a sliding transition instead of an abrupt jump in that the displayed environmental detail moves slidingly from the previous to the new direction. From the driver's point of view, a continuously adjustable scrolling operation is obtained. Thereby, the driver more easily stays oriented with respect to the information content of the display picture.

As demonstrated by the last described embodiments, the definition of the displayed environmental detail may depend on several factors. The system is basically used for monitoring the last traveled road areas. However, in exceptional cases, targeted deviations can take place therefrom depending on the situation and the displayed environmental detail can be defined differently, for example, with respect to an approaching other vehicle. The described situation-related deviations from a monitoring of the last traveled road areas by the system can be activated or can intervene in this case, for example, in the manner of an interruption in the corresponding situation. The weighting of such factors when defining the displayed environmental detail may therefore according to predefined activation rules be dependent on the type of the traffic situation. However, as an alternative or in addition, it may also be variably controlled as a function of respective adjustments by the user.

For this purpose, the driver can be provided with an operating possibility for the manual adjustment in order to vary weightings with which the different influencing variables are provided, by which the displayed environmental detail can be defined. Predefined weighting profiles and/or weighting profiles changeable by the driver may also be provided for different situations, such as an expressway, a country road or a city with or without a traffic jam, as predefined automatic adjustments.

Figure 7:
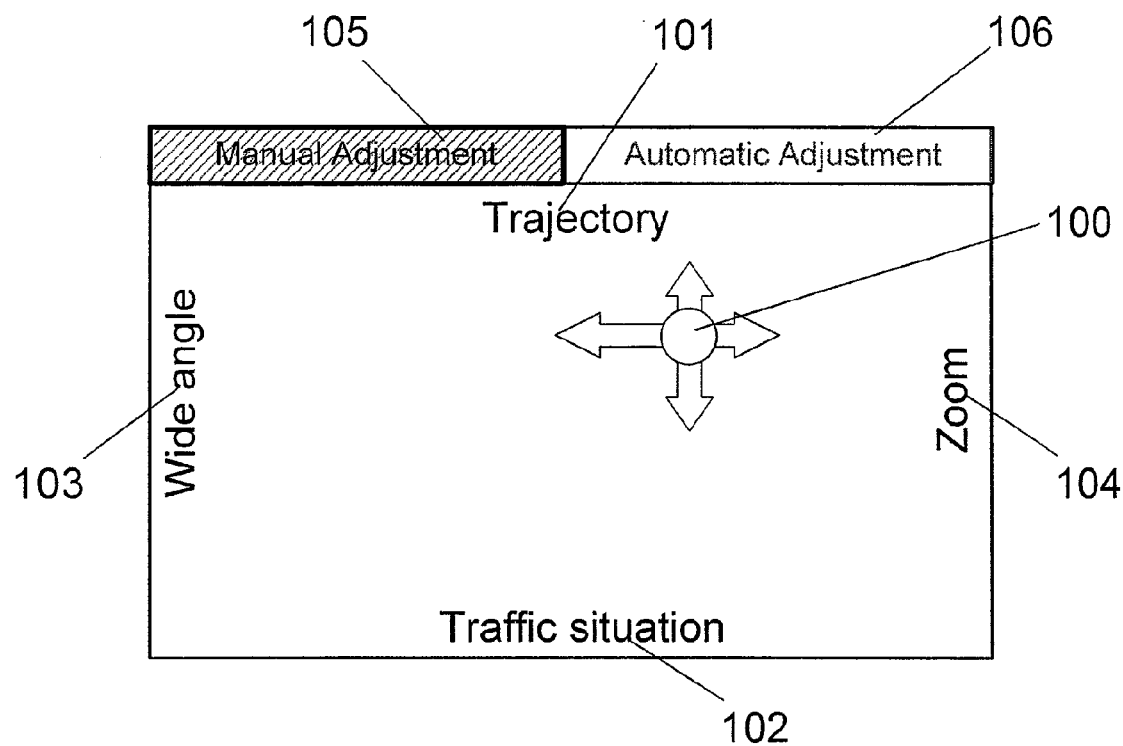
FIG. 7 is a view of a graphic display of an operating interface for the parameterization of a preferred embodiment of the system according to the invention.

FIG. 7 shows an operating surface by which corresponding adjustments of the user can be given as orders to the system. In the top line of FIG. 7, the basic options "manual adjustment" 105 or "automatic adjustment" 106 are indicated in the style of so-called tabs.

In the case of the manual adjustment selected in the present case, the vertical position of a point 100 and thus the weighting of the competing definition influences "trajectory" 101 and "traffic situation" 102 can be predefined. The operator's input takes place, for example, by way of a touch screen or by the displacement of a rotary/push knob. When Point 100 is displaced downward, the system will deviate in a higher number of special traffic situations from the main task of monitoring the last traveled road areas. When Point 100 is displaced upward, this occurs in a smaller number of special traffic situations.

Likewise, the horizontal position of Point 100 and thus the weighting of the competing definition influences "wide angle" 103 and "zoom" 104 can be predefined. When Point 100 is displaced to the left, the system has the tendency to set a wide-angle perspective in the case of several traffic-relevant directions in order to, if possible, cover all these directions in the displayed environmental detail. When Point 100 is displaced farther to the right, the zooming will rather take place to a single viewing direction, specifically the viewing direction classified as the most critical or most important.

According to a preferred embodiment, the display of the environmental detail by the display unit is accompanied by a symbolic representation which points out the position of the currently displayed environmental detail relative to the motor vehicle.

In the simplest case, the symbolic representation can be implemented by a pictorial display of the direction of the represented environmental detail relative to the motor vehicle. In particular, this pictorial representation may contain a pictorial representation of the vehicle itself. The pictorial representation may especially also show or illustrate the relationship between a reference axis of the vehicle, for example, the longitudinal axis of the vehicle, and the viewing direction from the vehicle to the environmental detail. For example, a top view of the motor vehicle may be shown from a bird's eye view, and the viewing direction from the vehicle to the environmental detail is represented by an arrow originating from the vehicle and/or by an opening beam. The length of such an arrow or the opening angle of such a beam may, in addition, represent the zoom factor.

Such a pictorial representation or another symbolic representation can particularly be produced behind a semitransparent mirror layer of a rearview mirror of the vehicle. The driver, who uses the mirror in the normally conventional manner, is ergonomically informed by this additional pictorial representation as to which additional information is made available to him by a display unit which may be arranged in the vehicle interior at a completely different point. An insertion of the pictorial representation into the interior rearview mirror of the vehicle is particularly advantageous.

In a particularly elegant manner, the insertion of the pictorial representation into a rearview mirror establishes a relationship between the utilization of conventional rearview mirrors and the invention. Specifically, the system can naturally be used as a pure addition to conventional rearview mirrors. As a result, a possible breakdown or a faulty action of the electronic unit by which the invention is implemented, as a rule, should not be considered to be critical with respect to safety. Even when a camera used according to the invention as the image-taking device or a corresponding electronic control unit fails, or even in the event of a local power failure, the driver will retain the conventional mirror view.

Figure 8:
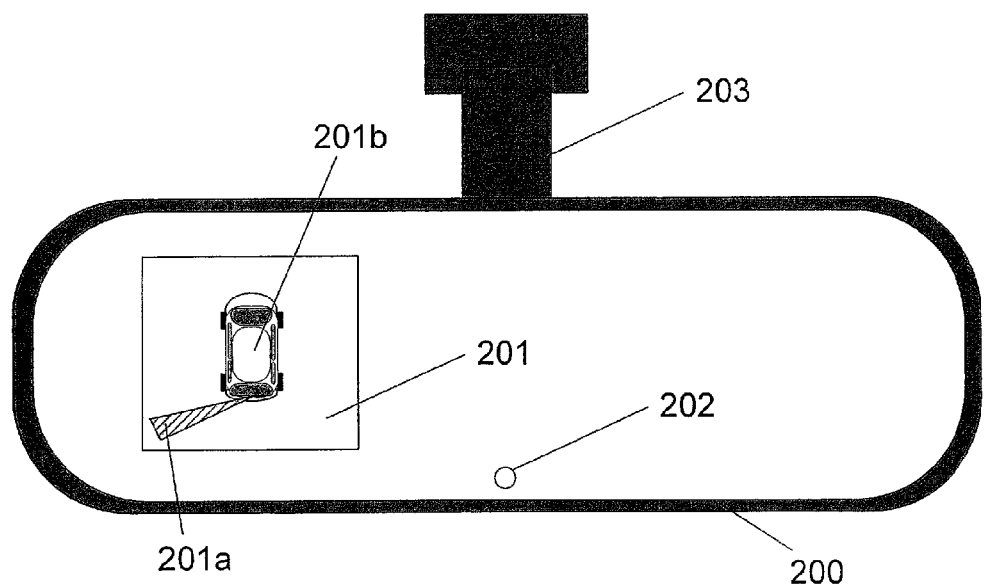
FIG. 8 is a view of an embodiment of an interior rearview mirror with the possibility for displaying a pictorial representation which points to the position of the currently displayed environmental detail relative to the motor vehicle.

FIG. 8 is a schematic view of an embodiment of a rearview mirror 200 with a mounting device 203 and a brightness sensor 202. The figure shows the possibility of displaying a pictorial representation (Field 201) which points to the position of the currently displayed environmental detail relative to the motor vehicle. In the present case, this is implemented by a beam 201*a*, by whose alignment with respect to the image 201*b* of the motor vehicle the driver can orient himself. The environmental detail itself, however, is displayed by a display unit, for example, arranged in the center console of the vehicle.

In addition to a symbolic representation, which points to the position of the currently displayed environmental detail relative to the vehicle, however, also the picture detail itself displaying the environmental detail can be generated behind such a semitransparent rearview mirror of the vehicle. The driver then does not have to significantly change his viewing direction in order to see either the environmental detail inserted in the mirror surface or the actual mirror image. For a better classification or interpretation, the additional pictorial display indicates to the driver which environmental detail is shown to him by the also inserted picture detail.

So that the actual mirror image continues to be available, the mirror surface not used for displaying the environmental detail can preferably still be used as a mirror in its actual sense. The rearview mirror remains conventionally usable also in the event of a breakdown or faulty action of the display unit or of the electronic unit of the system.

Figure 9:
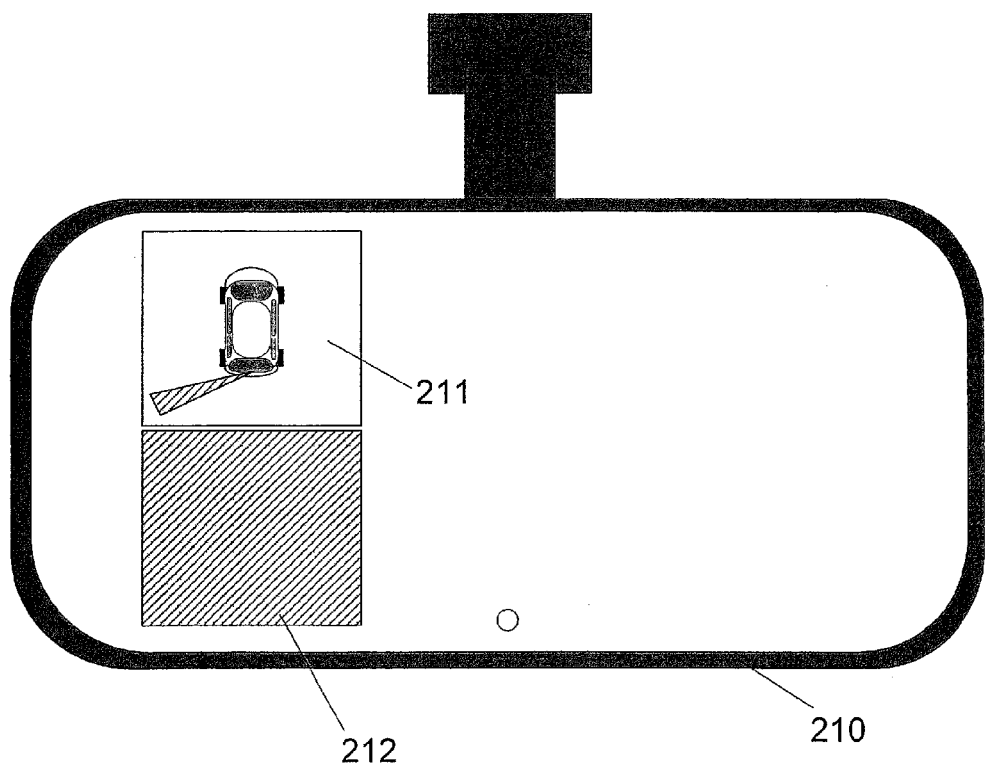
FIG. 9 is a view of an embodiment of an interior rearview mirror with the possibility for displaying such a pictorial representation and an environmental detail.

FIG. 9 is a schematic view of an embodiment of a rearview mirror 210 with the possibility of displaying a pictorial representation, which indicates the position of the currently displayed environmental detail relative to the motor vehicle (Field 211), and of displaying the environmental detail (Field 212). Field 211 can be implemented by way of transilluminating display units (as, for example, in the case of a taximeter); Field 212 can be implemented by a TFT display. However, the two fields 211 and 212 may also be implemented by a common TFT display.

A construction of the type in which the arrangement of the environmental detail within the mirror surface is a function of the position of the environmental detail with respect to the motor vehicle is particularly advantageous. A position of the environmental detail on the right behind the motor vehicle may then, for instance, manifest itself in an arrangement of the environmental detail on the right bottom within the mirror surface. In order to permit the above, a display unit, which is larger than the display of the environmental detail itself, has to be integrated in the rearview mirror. The display unit may even extend over the entire mirror surface. So that the actual mirror image will continue to be available in the parts of such a display unit that are in each case not utilized for displaying the environmental detail, the display surface not used for representing the environmental detail can preferably change into a reflective condition as long as it is not needed for displaying the environmental detail. In the simplest case, this can be implemented in that a semitransparent mirror surface covers the display unit. The semitransparent mirror surface will reflect, i.e. it is changed to a reflective condition, in all areas not backlit by the display unit. Again, in the event of a breakdown of the display unit, the rearview mirror will also remain conventionally usable.

Figure 10:
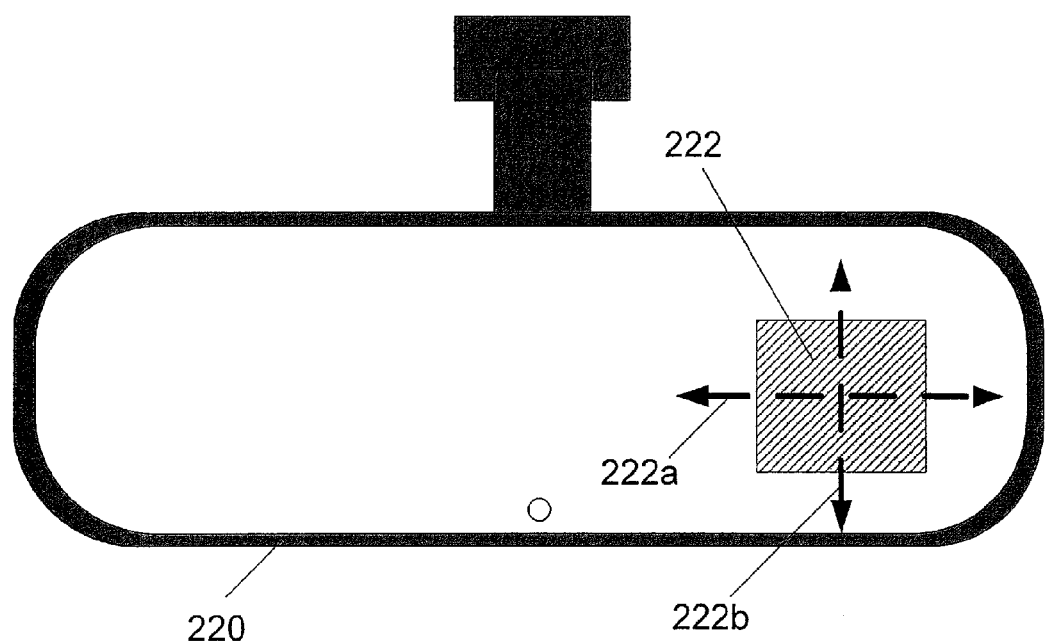
FIG. 10 is a view of an embodiment of an interior rearview mirror with the possibility for displaying an environmental detail instead of the mirror surface, which corresponds to the position of the environmental detail with respect to the motor vehicle.

FIG. 10 is a schematic view of an embodiment of a rearview mirror 220 with the possibility of displaying the environmental detail (Field 222) at a location of the mirror surface corresponding to the position of the environmental detail with respect to the motor vehicle. The arrows 222a and 222b not actually visibly indicated to the driver, illustrate the displaceability of Field 222 within the mirror surface only for explanatory purposes. An additional pictorial representation, which points out the position of the actually displayed environmental detail relative to the motor vehicle (comparable to Field 211 from FIG. 9) may, but does not have to be eliminated in such a construction.

Further embodiments, which also provide a representation of the environmental detail as a function of the position of the environmental detail with respect to the motor vehicle and/or a representation of the environmental detail accompanied by a symbolic representation of the position of the environmental detail with respect to the motor vehicle, relate to a heads-up display of the motor vehicle. An insertion of information by way of a heads-up display should be considered to be particularly advantageous because the driver does not have to turn his view away from the driving situation in order to perceive and interpret the information.

By way of a multicolored heads-up display of the motor vehicle, the image detail displaying the environmental detail can be displayed without any significant further processing. In contrast, by way of a monochromic heads-up display, the image detail displaying environmental detail can be shown, for example, in that the image detail is converted to bit-map graphics. In this case, the frequency of the bright dots in an image area can correspond to the brightness of the image area (dithering). To the extent that different gray scales can be displayed, the image detail can also be converted to a corresponding gray image.

Also in the case of a representation by means of a heads-up display, the position of the image detail showing the environmental detail with respect to immobile parts of the vehicle can be defined as a function of the position of the environmental detail with respect to the motor vehicle. Corresponding to this position, the image detail can, for example, move within a certain frame of the entire display surface of the heads-up display or also within the entire display surface of the heads-up display. The residual display surface remains available for other purposes. It can either be utilized for other displays or remains fully transparent in order to permit the driver to have an unobstructed view of the traffic situation.

An operating surface for changing settings, as, for example, illustrated in FIG. 7, can be shown in the heads-up display. Likewise, only the current settings also may be shown in the heads-up display in a detailed or brief symbolic form. Particularly, the latter can naturally take place simultaneously with the display of the image detail itself. Always solely by means of the heads-up display, the driver can then ascertain according to which criteria the displayed environmental detail is or was selected.

Figure 11:
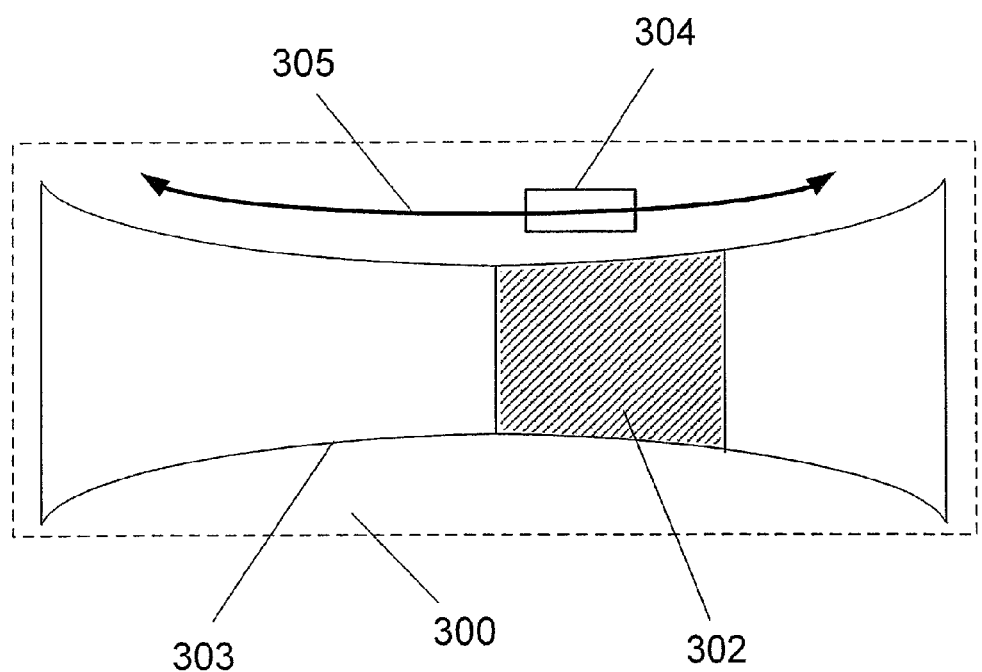
FIG. 11 is a view of an embodiment of a display with an image detail transformed corresponding to the position of the environmental detail with respect to the motor vehicle.

In addition to a variation of the position of the image detail in the heads-up display as a function of the position of the environmental detail with respect to the motor vehicle, the image detail can also be subjected to a geometrical transformation which points to the displayed spatial or angular area. In particular, such a geometrical transformation can be further developed such that it generates a spatial impression as a result of its curvature, shadowing, etc. FIG. 11 illustrates a correspondingly transformed picture detail 302. Advantageously, a spatial impression is therefore generated also without an actual use of 3-D technology for the stereoscopic representation.

In addition, corresponding to the displaceability of the image detail 222 from FIG. 10, the image detail 302 from FIG. 11 can be displaced in the display surface 300 of the heads-up display. To an extent, a frame 303 may be provided as a frame for guiding this displacement, the image detail sliding along this frame 303 during the displacement. The shape of the frame 303 and the distortion of the image detail 302 will then jointly demonstrate the possibility of a rotatory pan around the motor vehicle to which the displayed environmental detail can be subjected. The position of the image detail 302 within the frame 303 also provides the driver with information concerning the position of the displayed environmental detail with respect to the motor vehicle. However, the above-mentioned distortion additionally facilitates the interpretation.

As an alternative or in addition (in the case of FIG. 11, in addition), for a further illustration, a symbolic image 304 of the image detail 302 can be shown, which is displaced along a guiding line 305. This simplified symbolic form of representation can also be used autonomously, which corresponds approximately to the information content of the embodiment illustrated in the case of the insertion in a rearview mirror by means of FIG. 8.

In the same or similar manner, simultaneously several image details, each showing an environmental detail, may also be displayed in the display surface. In this case, the several environmental details do not have to be connected with one another or adjoin one another, and neither do the image details. The arrangement and, as required, the distortion of each of the environmental details within the display surface is preferably in each case selected corresponding to the position of the respective environmental detail with respect to the motor vehicle. During an adaptation of the environmental details, the image details "move" correspondingly within the display surface.

According to another embodiment, stereoscopic display devices are used for showing the image detail in the view of the driver of the motor vehicle in a virtual plane which, as a result of its alignment and/or curvature points to the position of the environmental detail shown in the image detail with respect to the motor vehicle. During an adaptation of the environmental detail, this virtual plane is preferably further rotated or curved in step with the adaptation. If permitted by the display technique used, the virtual space, in which the virtual plane is aligned or curved, can arbitrarily—for example, semi-spherically—be curved into the mirror plane or the windshield plane (in the case of a heads-up display). In order to implement such an embodiment in connection with an insertion of the image detail showing the environmental detail into a rearview mirror, a stereoscopic TFT display can be used. Such displays, which permit a stereoscopic perception without the need to wear bulky aids, such as shutter spectacles or a head mount display, have become commercially available and, as described above for conventional displays, can be housed behind a partially transparent mirror surface of the rearview mirror.

According to a preferred embodiment, a disturbance-caused deflection of the imaging system used as the image-taking device from its desired position, which may be present, for example, in a calculated manner with respect to the height and the angles, is compensated by a dynamic selection of the image detail counteracting the disturbance. Such a disturbance-caused deflection may, for example, be caused by a pitching and/or rolling motion of the vehicle. The former may particularly again be the result of a changed road gradient; the latter may be the result of fast cornering. Certain signals available in the vehicle anyhow may be used as measured quantities which are used as an orientation for the compensation. These are, for example, signals of the chassis stabilization, of the pneumatic suspension, etc. As a result of the compensation, the environmental detail to be displayed will be shown correctly even in the case of a change of the gradient of the road or during fast cornering.

Such a disturbance-caused deflection may, for example, also be caused by a driving vibration of the imaging system. Therefore, according to a preferred embodiment, which can be used as an alternative or in addition, driving vibration of the imaging system from its computed desired position is compensated by a dynamic selection of the shown field of view. Also in this case, for controlling or automatically controlling the corresponding image stabilizer unit, the vehicle sensors for detecting the vibration, loading, etc. can be used. A clear difference exists here in comparison with, for example, image stabilizers known from camcorder technology.

Figure 12:
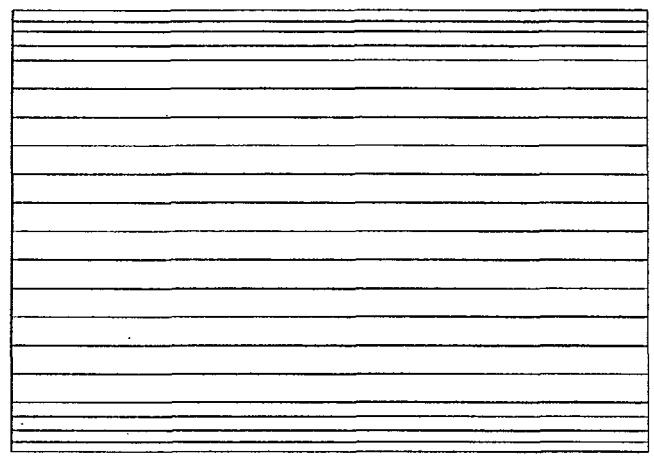
FIG. 12 is a view of a first imaging function for a compression in the edge area of the image detail.
Figure 13:
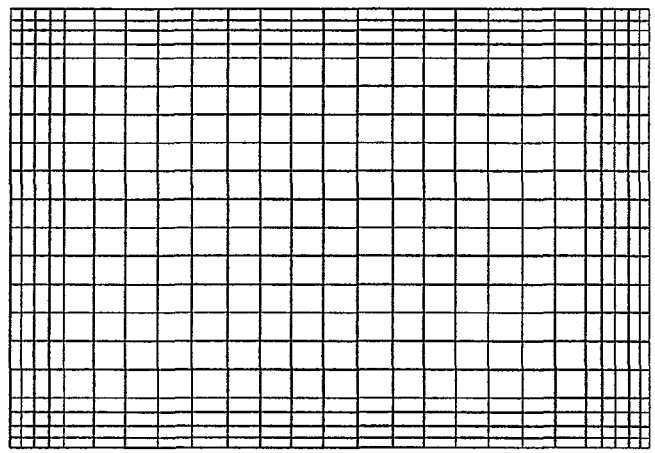
FIG. 13 is a view of a second imaging function for a compression in the edge area of the image detail.

According to a preferred embodiment, which can be used as an alternative or in addition, the image detail to be displayed is subjected to a geometrical transformation before it is displayed, by which transformation the image detail is compressed at least in an edge area. FIGS. 12 and 13 illustrate potential imaging functions for such a compression in the edge area. In FIG. 12, only the upper and the lower edge areas are compressed; in FIG. 13, all edge areas are compressed. In this case, the main area in the center of the picture is preferably not distorted. It may even be actively corrected in order to compensate distortion caused by the picture taking. The compression increases in the edge areas. In the present case, the compression increases monotonously. As a result, the behavior of a non-spherical mirror is almost simulated. When the display size of the picture contents in the center of an environmental detail to be displayed is unchanged, the environmental detail as a whole can be selected to be larger because of the compression in the edge area. As a result, it can be avoided that objects in the environment are overlooked only because they are (or were just barely) no longer contained in the defined environmental detail. When they are displayed by the display unit, the edge areas may be marked as such in that—as in the case of a non-spherical mirror—a dividing line is inserted between the undistorted main area and the distorted edge area.

According to a preferred embodiment, which can be used as an alternative or in addition, the displayed environmental detail can be adapted as a function of the operator's head and/or eye movements. For example, a so-called vehicle interior camera system is known which continuously acquires and (mainly for the adaptation of the restraint systems of the vehicle) analyzes the occupants' head position. Such a system, which is already present for other purposes, can be used for these other purposes as well as for the purposes of this embodiment. In this manner, a comfortable and intuitive operating possibility for influencing the automatic selection of the environmental detail is opened up to the operator. For example, when the driver's head approaches the mirror, the displayed image may be zoomed more; in the case of a lateral head motion (relative to the previous average head position of the driver), it may also slightly swing to the side.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for monitoring an environment of a motor vehicle, the system comprising:
   one or more imaging devices for captured a sequence of images, which sequence contains images of at least a part of the environment of the motor vehicle;
   a display unit for reproducing at least one image detail of the image sequence in an interior of the vehicle, said display unit including one or more devices for automatically changing an environmental detail shown by the reproduction of the image detail;
   one or more devices for determining a plurality of earlier positions of the motor vehicle while the motor vehicle is traveling in a forward direction; and wherein the environmental detail is automatically adaptable as a function of the each of the plurality of earlier positions of the motor vehicle, and wherein the automatic adaptation of the environmental detail further comprises changing an area of the environment to which the environmental detail corresponds;

wherein at least as a function of each of the plurality of earlier positions, a preferred display detail is definable in the environment of the motor vehicle; and wherein the environmental detail is adaptable such that essentially the preferred display detail is continuously displayed.

2. The system according to claim 1, wherein the earlier positions are included in the determination of the preferred display detail with a different weighting as a function of at least one of:

their time-related past, and their distance from a current vehicle position.

3. The system according to claim 1, wherein the preferred display detail is defined in a manner oriented according to a quality measurement, which quality measurement evaluates at least one of whether and where the earlier positions of the motor vehicle are contained in the display detail.

4. The system according to claim 1, wherein adaptation of the environmental detail additionally takes place as a function of a forward driving speed of the motor vehicle.

5. The system according to claim 1, wherein adaptation of the environmental detail additionally takes place as a function of at least one future position of the motor vehicle.

6. The system according to claim 1, further comprising:

one or more devices for determining a plurality of earlier steering angle values of the motor vehicle;

wherein the preferred display detail in the environment of the motor vehicle is further definable at least as a function of the plurality of earlier steering angle values.

7. The system according to claim 1, wherein the at least one earlier position of the motor vehicle is determinable by electronic map data.

8. The system according to claim 6, wherein the at least one earlier position of the motor vehicle is determinable by electronic map data.

9. The system according to claim 1, wherein the environmental detail is automatically adaptable as a function of additional state variables of the environment of the vehicle.

10. The system according to claim 9, wherein at least one object equipped with an RFID chip is detectable and locatable in the vehicle environment by a detection unit of the motor vehicle; and wherein the environmental detail is adaptable as a function of a position of the object.

11. The system according to claim 1, wherein a weighting of different influencing variables is adaptable based on operating actions of a vehicle occupant when defining the environmental detail.

12. The system according to claim 1, wherein at least one of:

(a) a display of the environmental detail takes place as a function of a position of the environmental detail with respect to the motor vehicle; and (b) a display of the environmental detail is accompanied by a symbolic representation of the position of the environmental detail with respect to the motor vehicle.

13. The system according to claim 12, wherein arrangement of the environmental detail within a display surface of the display unit is a function of the position of the environmental detail with respect to the motor vehicle.

14. The system according to claim 13, wherein the display unit is one of:

(a) integrated in a mirror surface of a rearview mirror of the motor vehicle; and (b) constructed as a mirror surface of the rearview mirror, in which the display surface not utilized for displaying the environmental detail is changeable to a reflective condition.

15. The system according to claim 12, wherein at least one of:

(a) a distortion of the environmental detail is a function of the position of the environmental detail with respect to the motor vehicle;

(b) as a function of at least one of the position of the environmental detail with respect of the motor vehicle and the used zoom factor, the image detail is arranged in a certain plane of a three-dimensional display.

16. The system according to claim 1, wherein a change of the environmental detail caused by a pitching or rolling motion of the motor vehicle is compensatable by an opposed adaptation of the image detail.

17. The system according to claim 1, wherein a change of the environmental detail caused by a vibration of the motor vehicle is compensatable by an opposed adaptation of the image detail.

18. The system according to claim 1, wherein the image detail is compressed at least temporarily in at least one edge area with respect to a central picture area.

19. The system according to claim 1, further comprising:

one or more devices for determining an operator's eye position and/or viewing position; and wherein the environmental detail is adaptable as a function of said eye position and/or viewing position.

20. The system according to claim 1, further comprising one or more devices for illuminating the vehicle environment, wherein the illumination of the vehicle environment is controlled as a function of the environmental detail.

21. The system according to claim 1, wherein the preferred display detail that is displayed corresponds to image data captured at one of the plurality of earlier positions and not at a current position of the motor vehicle.

22. The system according to claim 1, wherein the preferred display detail corresponds to a following vehicle.

* * * * *